United States Patent

Komaki et al.

[11] Patent Number: 5,615,395
[45] Date of Patent: Mar. 25, 1997

[54] METHOD AND APPARATUS FOR DISASSEMBLING LENS-FITTED PHOTO FILM UNIT, AND FLASH CLEANING METHOD AND APPARATUS

[75] Inventors: Iwao Komaki; Saburo Nakajima; Fusao Ichikawa, all of Kanagawa, Japan

[73] Assignee: Fuji Photo Film Co., Ltd., Kanagawa, Japan

[21] Appl. No.: 546,896

[22] Filed: Oct. 23, 1995

Related U.S. Application Data

[63] Continuation of Ser. No. 154,449, Nov. 19, 1993, abandoned.

[30] Foreign Application Priority Data

Nov. 20, 1992 [JP] Japan .................................. 4-312413
Dec. 10, 1992 [JP] Japan .................................. 4-330436

[51] Int. Cl.$^6$ .................................................. G03B 19/00
[52] U.S. Cl. .................................................. 396/6; 396/661
[58] Field of Search .................................. 354/306, 307, 354/308, 309, 310, 312, 354, 288

[56] References Cited

U.S. PATENT DOCUMENTS

| | | | |
|---|---|---|---|
| 488,408 | 11/1989 | Mochida et al. | 354/75 |
| 4,972,649 | 11/1990 | Mochida et al. | 53/430 |
| 5,021,811 | 4/1991 | Maurinus et al. | 354/76 |
| 5,146,255 | 9/1992 | Nakai et al. | 354/288 |
| 5,148,198 | 9/1992 | Shiba | 354/319 |
| 5,170,199 | 12/1992 | Narai et al. | 354/126 |
| 5,202,713 | 4/1993 | Nakai et al. | 354/212 |
| 5,210,561 | 5/1993 | Nakai et al. | 354/297 |
| 5,223,871 | 6/1993 | Iwagaki et al. | 354/75 |
| 5,235,364 | 8/1993 | Ohmura et al. | 354/149.11 |
| 5,235,366 | 8/1993 | Kucmerowski | 354/212 |
| 5,285,229 | 2/1994 | Kanatha | 354/288 |
| 5,325,139 | 6/1994 | Matsumoto | 354/64 |
| 5,339,127 | 8/1994 | Muramatsu | 354/288 |

FOREIGN PATENT DOCUMENTS

| | | |
|---|---|---|
| 0565097 | 4/1993 | European Pat. Off. |
| 2247754 | 3/1992 | United Kingdom . |
| 2257801 | 1/1993 | United Kingdom . |

*Primary Examiner*—Safet Metjahic
*Assistant Examiner*—Nicholas T. Tuccillo
*Attorney, Agent, or Firm*—Sughrue, Mion, Zinn, Macpeak & Seas

[57] ABSTRACT

A used lens-fitted photo film unit has a photo film containing section and a front cover. The photo film containing section has a first retaining hook. The front cover has a second retaining hook. The second hook is retained on the first hook, and couples the front cover to the photo film containing section. In a disassembling station, the photo film unit is set in a predetermined orientation. An access plate is advanced toward the photo film unit. The access plate flexes the first hook apart from the second hook, and disengages it from the latter. The access plate is retracted while the front cover is captured by the access plate, thereby to remove the front cover from the photo film containing section. In a preferred embodiment, a flash device from the used photo film unit is supported so as to face upward a flashing face of the flash device. Cleanser liquid is sprayed on the flashing face. Cleaning tape comes in contact with the flashing face. The tape is moved on the flashing face while keeping the tape in contact with the flashing face, and wipes and cleanses the flashing face.

50 Claims, 15 Drawing Sheets

METHOD AND APPARATUS FOR DISASSEMBLING LENS-FITTED PHOTO FILM UNIT, AND FLASH CLEANING METHOD AND APPARATUS

This is a continuation of application Ser. No. 08/154,449 filed Nov. 19, 1993 now abandoned.

BACKGROUND OF THE INVENTION

1. Field of the Invention

The present invention relates to a method and apparatus for disassembling a lens-fitted photo film unit, and flash cleaning method and apparatus. More particularly, the present invention relates to a photo film unit disassembling method having a high efficiency, and an apparatus for the same, and method and a appratus for cleaning a flash device in order to improve a performance for flash emission.

2. Description Related to the Prior Art

Lens-fitted photo film units (hereinafter referred to simply as film units) are now on the market, e.g. under the trade name "Fujicolor Quick Snap" (manufactured by Fuji Photo Film Co., Ltd.). Such known photo film units are a single-use camera, as is disclosed in U.S. Pat. Nos. 4,884,087 and 4,972,649, which is preloaded with 135-type photographic filmstrip (hereinafter referred to as film) defined by the International Standard Organization (ISO) version 1007, 1979. A photo film housing of the photo film unit is constituted of a main assembly loaded with photo film with a cassette, a front cover secured in front of the main assembly, and a rear cover secured behind the main assembly. The main assembly includes a shutter mechanism, a taking lens, and a flash device. The photo film unit, like a simple photo film cassette, it can be deposited to a photofinishing agent in its entirety after photography. In a photo laboratory, a photofinisher removes the cassette with the exposed photo film, treats the photo film in development and printing while using a conventional photofinishing system, and produces and provides photographic prints for the user, while returning the developed photo film.

Public concern is now directed to recycling parts of the photo film units, in view of economical use of limited resources and protection of the environment against destruction caused by successive disposal of industrial wastes. There are two ways to recycle such parts: remolding plastic parts after regenerating material, and using operable parts repeatedly after intact withdrawal. Although manufacturers used to discard in past the entirety of photo film units after being emptied, today resinous parts inclusive of the main assembly, front cover, and rear cover are melted and pelleted for remolding. The flash device is unified by securing to a printed circuit board a flash tube, a synchro switch and other circuits, and withdrawn for reuse in a new film unit, after renewing a battery therein.

It has been found, however, that the most difficult step to recycle a photo film unit is to disengage the parts secured one to another via the retaining structure. Disassembly in consideration of prevention of a reusable exposure section from being damaged requires careful manual handling of the photo film unit. Although improvement in general efficiency in recycling photo film units is desired, there is a limit to the speed of disassembly largely depending on manual operation.

There is another problem in conventional recycling operation. A flash emitting section of a flash device is constantly subjected externally to the front of the photo film unit throughout its use, so that, after withdrawal of photo film units from photofinishers, dirt such as fine dust and finger marks is frequently stuck on a transparent flashing face. Dirt on the flashing face lowers a light amount of the flash emitting section. Also, reuse an apparently dirty flash device might give a purchaser of a new photo film unit an impression of degradation in quality.

SUMMARY OF THE INVENTION

In view of the foregoing problems, an object of the present invention is to provide a method and apparatus for disassembling a lens-fitted photo film unit with efficiency.

Another object of the present invention is to provide a method and appratus for cleaning a flash device capable of improving a performance for flash emission.

In order to achieve the above and other objects and advantages of this invention, a used lens-fitted photo film unit to be disassembled is inclusive of first and second parts, of which the first part has a retaining member formed integrally, and the second part has a first portion formed integrally. The first portion is retained on the retaining member so as to couple the second part to the first part. To perform disassembly, the photo film unit is set in a disassembling station in a predetermined orientation. An access member is advanced toward the photo film unit. By use of the access member, the retaining member is flexed in a first direction apart from the first portion, so as to disengage the retaining member from the first portion. The access member is retracted while the second part is captured by the access member, so as to remove the second part from the first part.

In the photo film unit, the first part has a second retaining member formed integrally therewith. A third part has a second portion formed integrally therewith. The second portion is retained on the second retaining member so as to couple the third part to the first part. In further disassembling steps, the second retaining member is pressed by use of a second access member so as to release the second portion. A capturing member for capturing the third part is advanced to the third part. The advanced capturing member is displaced to a capturing position where the third part is captured. The capturing member is retracted from the first part with the third part captured, while the second retaining member is pressed, so as to remove the third part from the first part.

The automated operation of the present invention can increase the speed of disassembly to a great extent, to meet the desire for improvement in general efficiency in recycling photo film units.

In a preferred embodiment, before pressing the second retaining member, a pair of terminals of a main capacitor of the flash device is short-circuited by use of a resistor, so as to discharge the main capacitor.

To clean a flashing face of a flash device incorporated in the used lens-fitted photo film unit, the flash device is supported so as to face upward a flashing face of the flash device. Cleanser liquid is supplied to the flashing face. Cleaning tape is brought in contact with the flashing face. The tape is moved relatively to the flashing face while keeping the tape in contact with the flashing face, so as to wipe and cleanse the flashing face.

The performance of the flash device for flash emission can be improved. Should dirt be stuck on the flashing face, the flashing face is cleansed to improve a light amount of the flash emitting section. Should a flash device be reused in a new photo film unit, no degradation in quality will by perceived by a purchaser.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS OF THE PRESENT INVENTION

Figure 1:
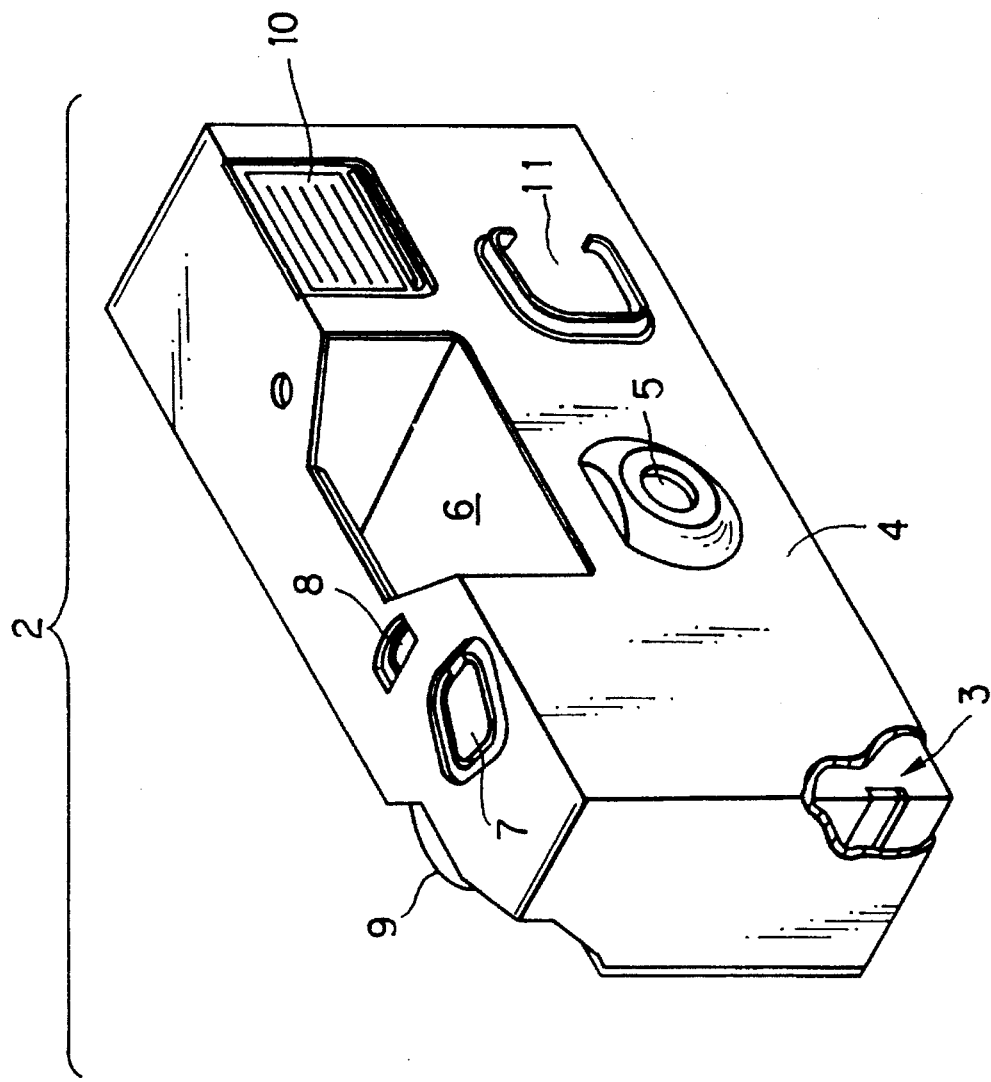
FIG. 1 is a perspective view illustrating a lens-fitted photo film unit to be treated in the present invention.

In FIG. 1 illustrating a lens-fitted photo film unit 2, a photo film housing 3 is formed from plastics, and generally packaged in an outer case or cardboard packaging 4. The packaging 4 is adapted to preservation and neat appearance of the photo film unit 2, and provided with printing of information and decoration. For photography, the packaging 4 has openings or holes for a taking lens 5, a viewfinder window 6, a shutter button 7, a frame number indicator window 8, and a photo film winding wheel 9, and a flash emitting section, of which has a transparent front face 10. If photography with flashing is desired, a switch button portion 11 is kept depressed during operation of the shutter button 7.

Figure 2:
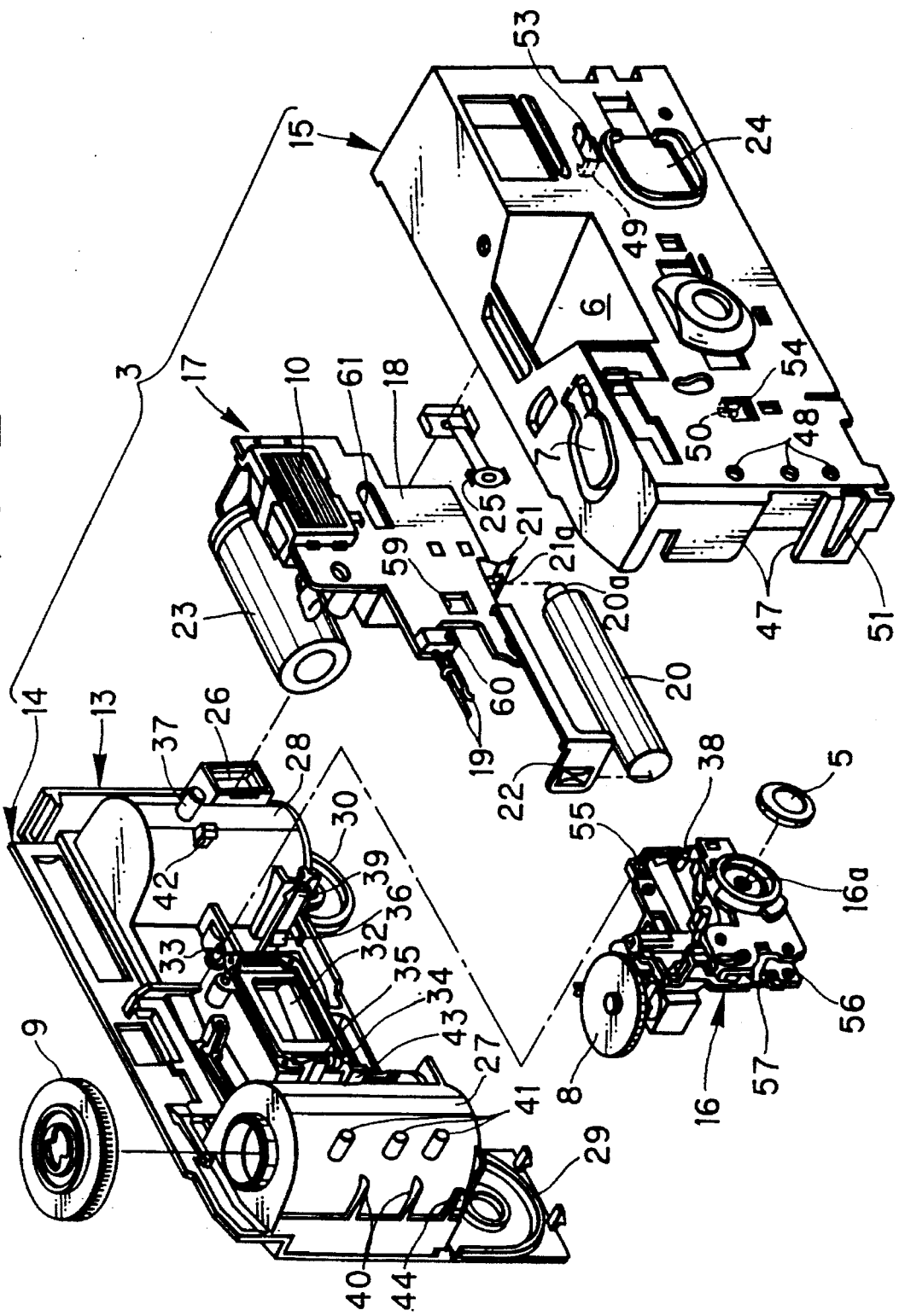
FIG. 2 is an exploded perspective view illustrating the photo film unit of FIG. 1.
Figure 3:
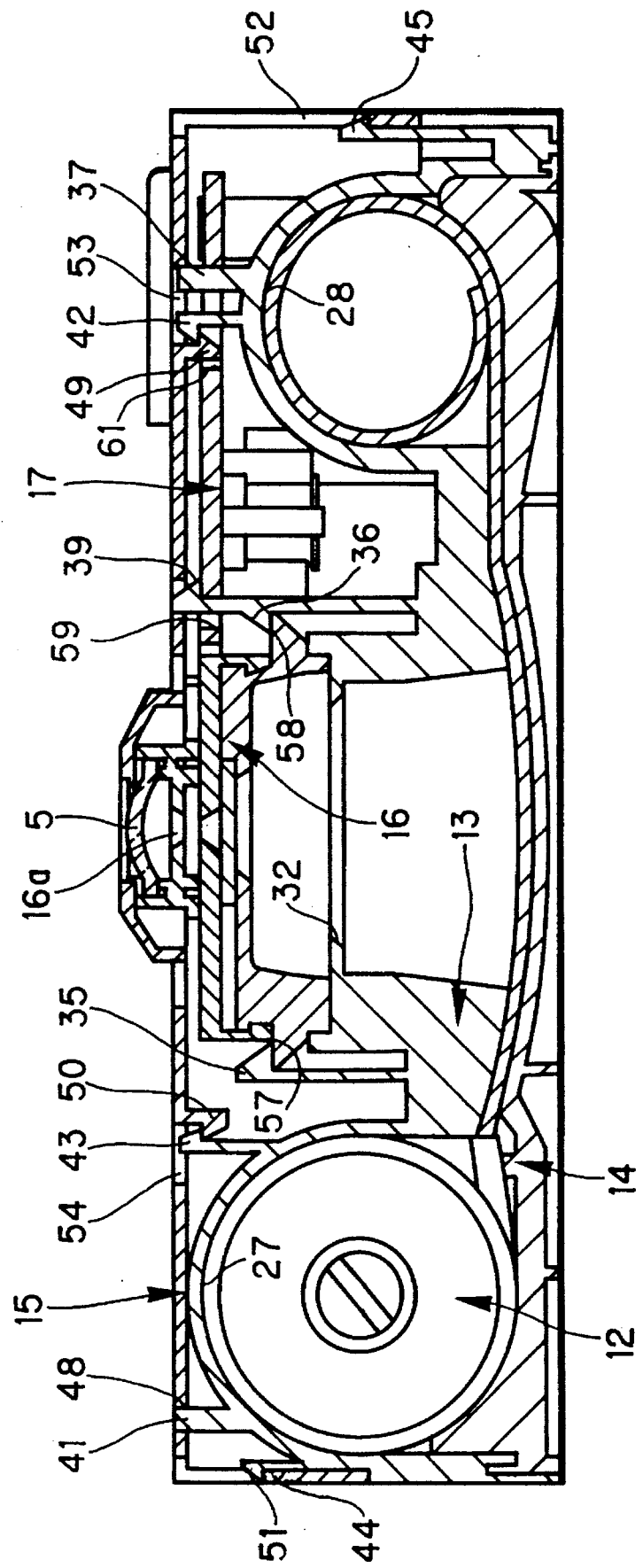
FIG. 3 is a horizontal section illustrating the photo film unit.

As illustrated in FIGS. 2 and 3, the photo film housing 3 is constituted of a photo film containing section 13, a rear cover 14 behind the photo film containing section 13, a front cover 15 in front of the photo film containing section 13, an exposure section 16, and an electronic flash device 17. Both the front cover 15 and the rear cover 14 are mounted light-tightly on the photo film containing section 13, the latter of which prevents photo film inside the photo film housing 3 from exposure to ambient light. The exposure section 16 is constituted of a counter mechanism, a shutter mechanism, a photo film wind stopping mechanism, and the taking lens 5. The taking lens 5 is sandwiched between the front cover 15 and the exposure section 16 at a stop aperture 16a formed in the exposure section 16.

The flash device 17 is unified as a single section, which is constituted of relevant circuit elements, the flash emitting section with the front face 10, a synchro switch 19, a battery 20, terminal plates 21 and 22, and a main capacitor 23, all together on a printed circuit board 18. The terminal plate 21 is adapted to a positive electrode 20a projected from the battery 20, and has a recess 21a into which the positive electrode 20a is fitted. During photography with operation of the flash device 17, the depression of the switch portion 11 depresses a switch flap 24 and causes a contact segment 25 to come in contact with, and interconnect, two terminals, which stores electrical charge in a main capacitor 23. The charge stored in the capacitor 23, in response to a releasing operation of a shutter device, is discharged in a flash tube in the flash emitting section at the flashing face 10, through the synchro switch 19. Note that the contact segment 25 is mounted by being sandwiched between the front cover and a recess 26 in the photo film containing section 13.

The photo film containing section 13 has a cassette containing chamber 27 and a roll chamber 28, of which the former contains a cassette, and the latter contains the unexposed photo film having been wound out of the cassette to be a roll. Bottoms of the chambers 27 and 28 have openings, which are covered by doors 29 and 30 of a pull-top type both formed on the rear cover 14. The door 30 for the roll chamber 28 is used during the manufacture of the photo film unit, and adapted to insertion of a rotary jig on which a leader of the photo film is fitted and wind the photo film on to the jig while drawing out of the photo film from the cassette. The door 29 for the cassette containing chamber 27 is used after photography, and adapted to removal of the cassette containing the photo film after exposure. Note that, after each exposure, one who uses the photo film unit 2 winds the photo film frame by frame back into the cassette.

To mount the exposure section 16 on to the photo film containing section 13, the exposure section 16 is positioned by positioning pins 33 and 34 disposed beside an exposure aperture 32 diagonally, and afterwards secured by retaining hooks 35 and 36 disposed on respective horizontal sides of the exposure aperture 32. When the flash device 17 is to be mounted on the photo film containing section 13, the flash device 17 is positioned by a positioning pin 37 on the photo film containing section 13 and a positioning pin 38 on the exposure section 16, and afterwards secured by a retaining hook 39 on the photo film containing section 13. When the front cover 15 is to be mounted on the photo film containing section 13, the front cover 15 is positioned by guiding walls 40 and positioning pins 41 on the photo film containing section 13, and secured by retaining hooks 42, 43, 44 and 45 on the photo film containing section 13. Note that the exposure section 16, the flash device 17, and the front cover 15 are mounted all while moving rectilinearly toward the front of the photo film containing section 13.

The front cover 15 has a guiding wall 47 fitted on the walls 40, positioning holes 48 fitted on the pins 41, a retaining hook 49 engaged with the hook 42, a retaining hook 50 engaged with the hook 43, a retaining hole 51 engaged with the hook 44, and a retaining hole 52 engaged with the hook 45 (see FIG. 3). The hooks 49 and 50 are formed at respective through holes 53 and 54, and have hooking faces, which are located internally from the through holes 53 and 54 and so positioned as to hook the hooks 42 and 43. The exposure section 16 has a positioning hole 55 fitted on the pin 33, a positioning hole 56 fitted on the pin 34, a retaining portion 57 for retaining the hook 35, and a retaining portion 58 for retaining the hook 36. The flash device 17 has a retaining hole 59 engaged with the hook 39, a positioning hole 60 fitted on the pin 38, and a positioning opening 61 fitted on the pin 37. The opening 61 is adapted also to coming through of the hook 42.

An apparatus installed in a factory for disassemling the lens-fitted photo film unit 2 is now described. Photo film units are collectively withdrawn from a number of photo laboratories, and brought into the factory, where the photo film units are conveyed and treated in sip disassemling stations. The six disassembling stations are passed by the photo film unit 2 automatically conveyed, from which the packaging 4, the front cover 15, the battery 20, the flash device 17 and the exposure section 16 are removed in the order listed. Conveyance of the photo film unit 2 throughout the disassembling stations utilizes an assembling pallet AP, (see FIG. 7) on which the photo film unit 2 is placed. If the disassembling stations are arranged straight, the assembling pallet AP can be conveyed by a roller chain conveyor, a conveyor belt, and the like. If the disassembling stations are arranged circularly by use of a rotational movement, such assembling pallets can be arranged on an index rotary table circularly at a regular pitch, and conveyed by rotation of the table.

The photo film unit 2 is placed on the assembling pallet AP fixedly, with front cover 15 directed upward. Each disassembling station has positioning mechanism, which positions the photo film unit 2 at the stations with high precision. The first station is provided with an automatic device for removing the packaging 4 from the photo film unit 2. The automatic removing device breaks or cuts the packaging, for which a cutter is useful particularly when the packaging is of cardboard. The photo film unit 2 from which the packaging 4 is removed is conveyed to the second station.

Figure 4:
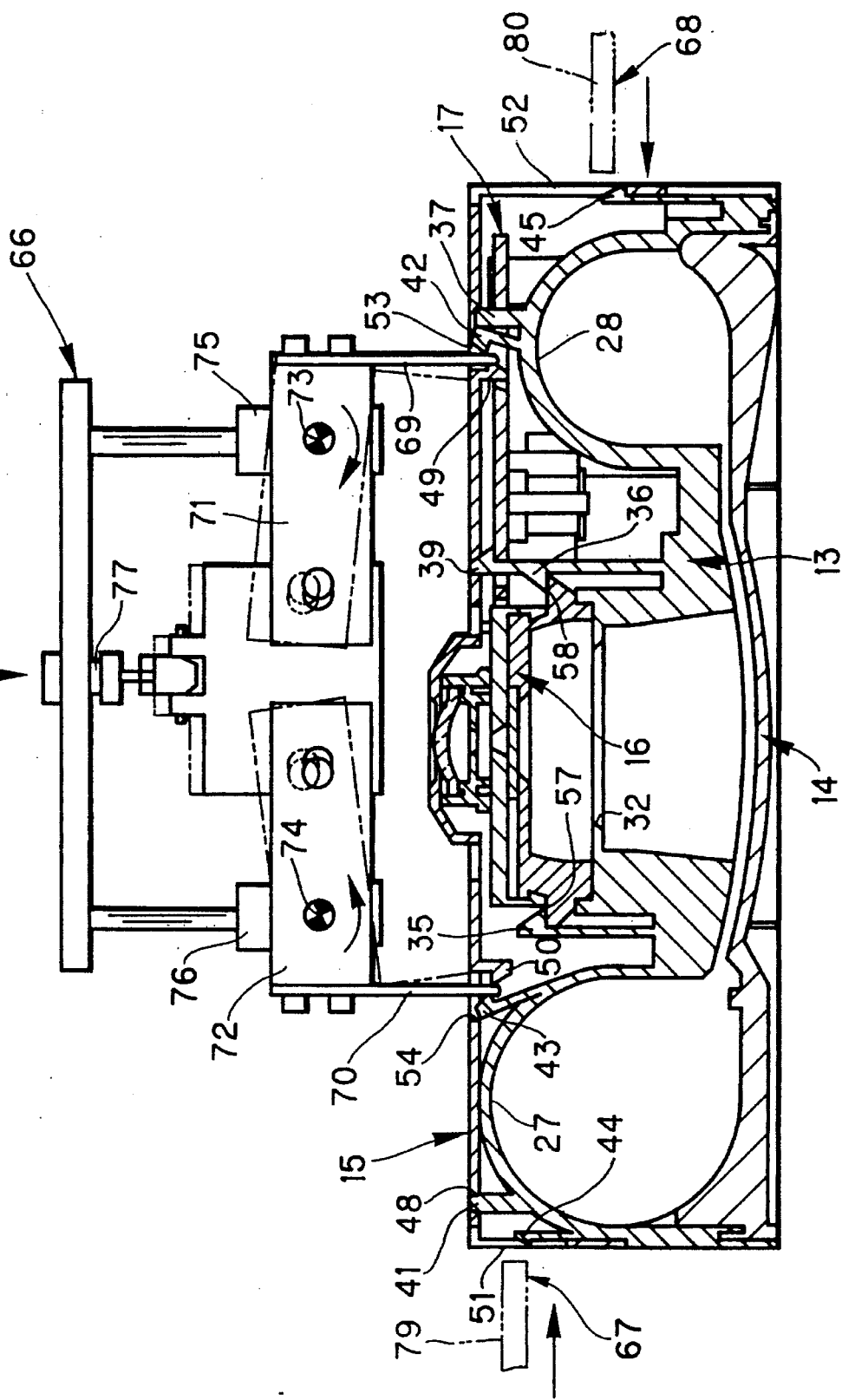
FIG. 4 is an explanatory view, in elevation, illustrating a station for removing a front cover from the photo film unit as shown in section.
Figure 5:
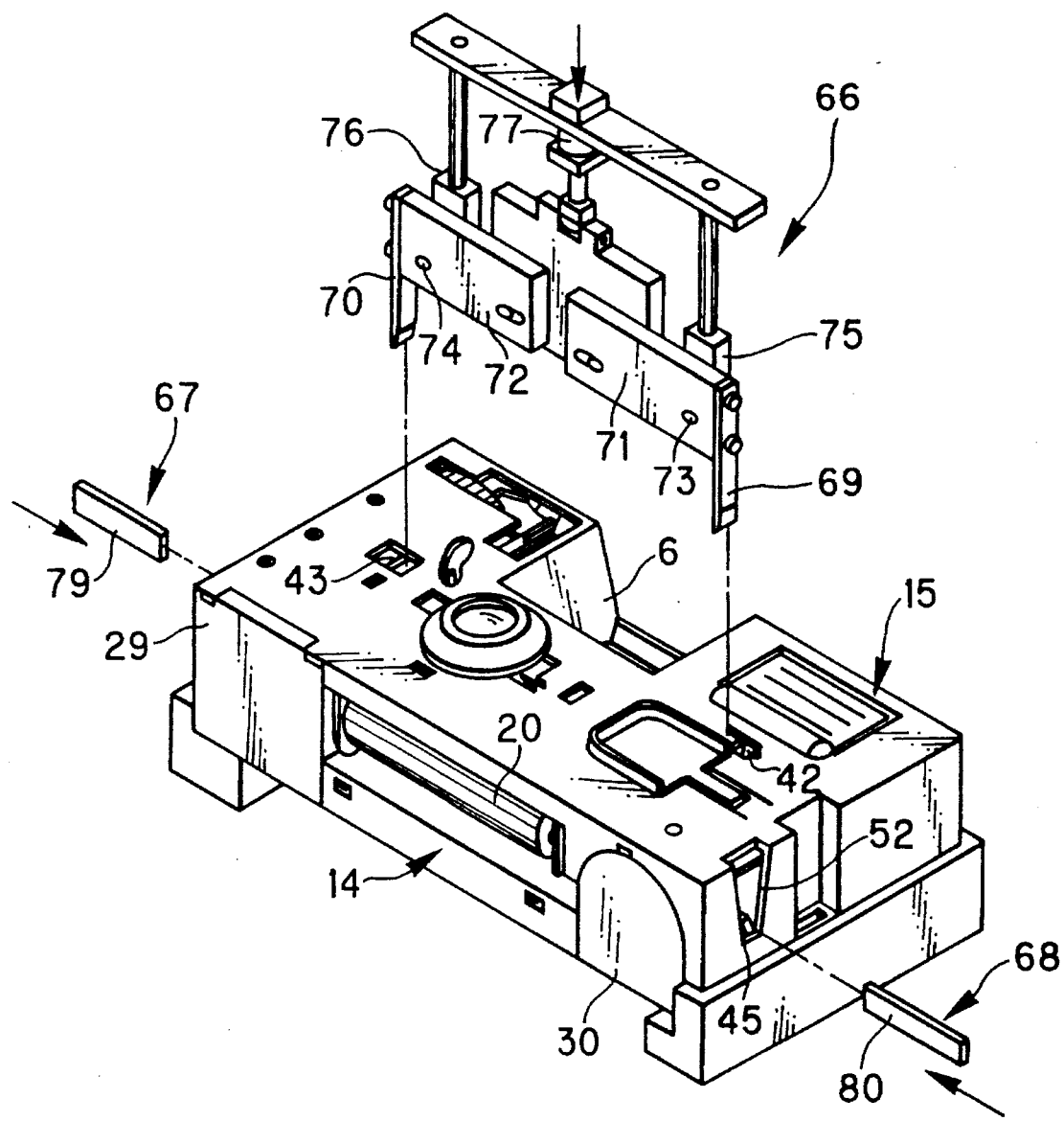
FIG. 5 is an explanatory view, in perspective, illustrating the removing station for the front cover.

The second station is illustrated in FIGS. 4 and 5 and is provided with an automatic device for removing the front cover 15 from the photo film containing section 13. The automatic removing device is constituted of a releasing/holding mechanism 66 and releasing mechanisms 67 and 68, which are all driven in synchronism. The releasing/holding mechanism 66 disengages the hooks 49 and 50 from the hooks 42 and 43, and holds the front cover 15. The releasing mechanism 67 disengages the hole 51 from the hook 44. The releasing mechanism 68 disengages the hole 52 from the hook 45.

The releasing/holding mechanism 66 has access plates 69 and 70 spaced in correspondence with the interval between the positions of the hooks 42 and 43, in other words the interval between the hooks 49 and 50 engaged with the hooks 42 and 43. Two holders 71 and 72 support the respective access plates 69 and 70 in the vertical direction. The holders 71 and 72 are supported on respective support members 75 and 76 rotatably at shafts 73 and 74. The releasing/holding mechanism 66 has a rectilinearly moving cylinder (not shown) which moves the support members 75 and 76 in the vertical direction. The releasing/holding mechanism 66 also has a rotation generating cylinder 77 which rotates the support members 75 and 76 equally. The releasing mechanisms 67 and 68 are caused by associated cylinders (not shown) to move respective unhooking rods 79 and 80.

Figure 6:
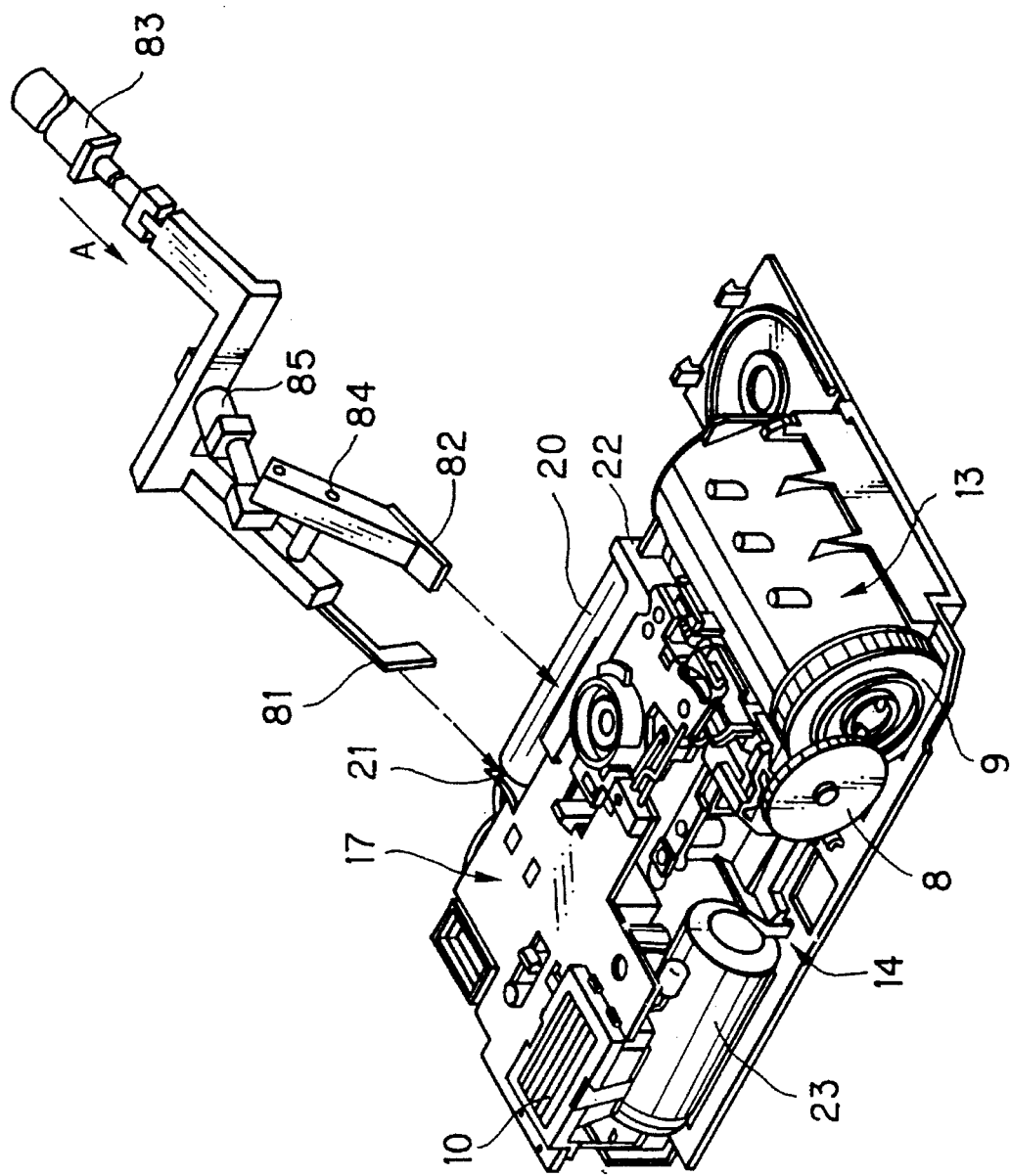
FIG. 6 is an explanatory view, in perspective, illustrating a station for removing a battery.
Figure 7:
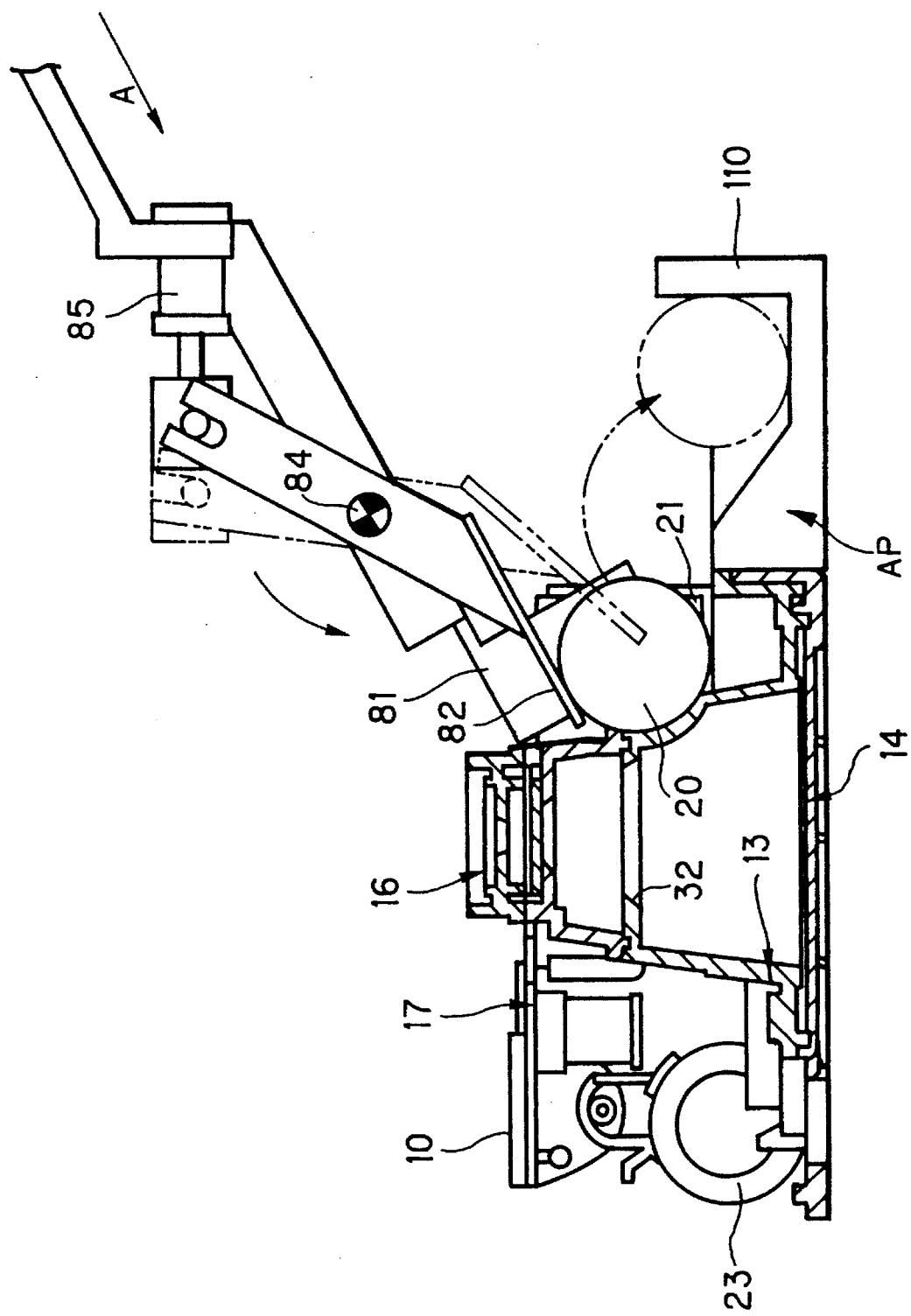
FIG. 7 is an explanatory view, in elevation, illustrating the removing station for the battery.

The third station, as illustrated in FIGS. 6 and 7, is provided with an automatic device for removing the battery 20 from the flash device 17. The removing device has an insert 81 for disengaging the electrode 20a of the battery from the opening 21a of the terminal plate 21. An ejector 82 is adapted to removal of the battery 20 from between the terminal plates 21 and 22. The insert 81 and the ejector 82 are advanced in the direction A by a rectilinearly moving cylinder 83. The ejector 82 is rotated at a shaft 84 when driven by a rotation generating cylinder 85.

Figure 8:
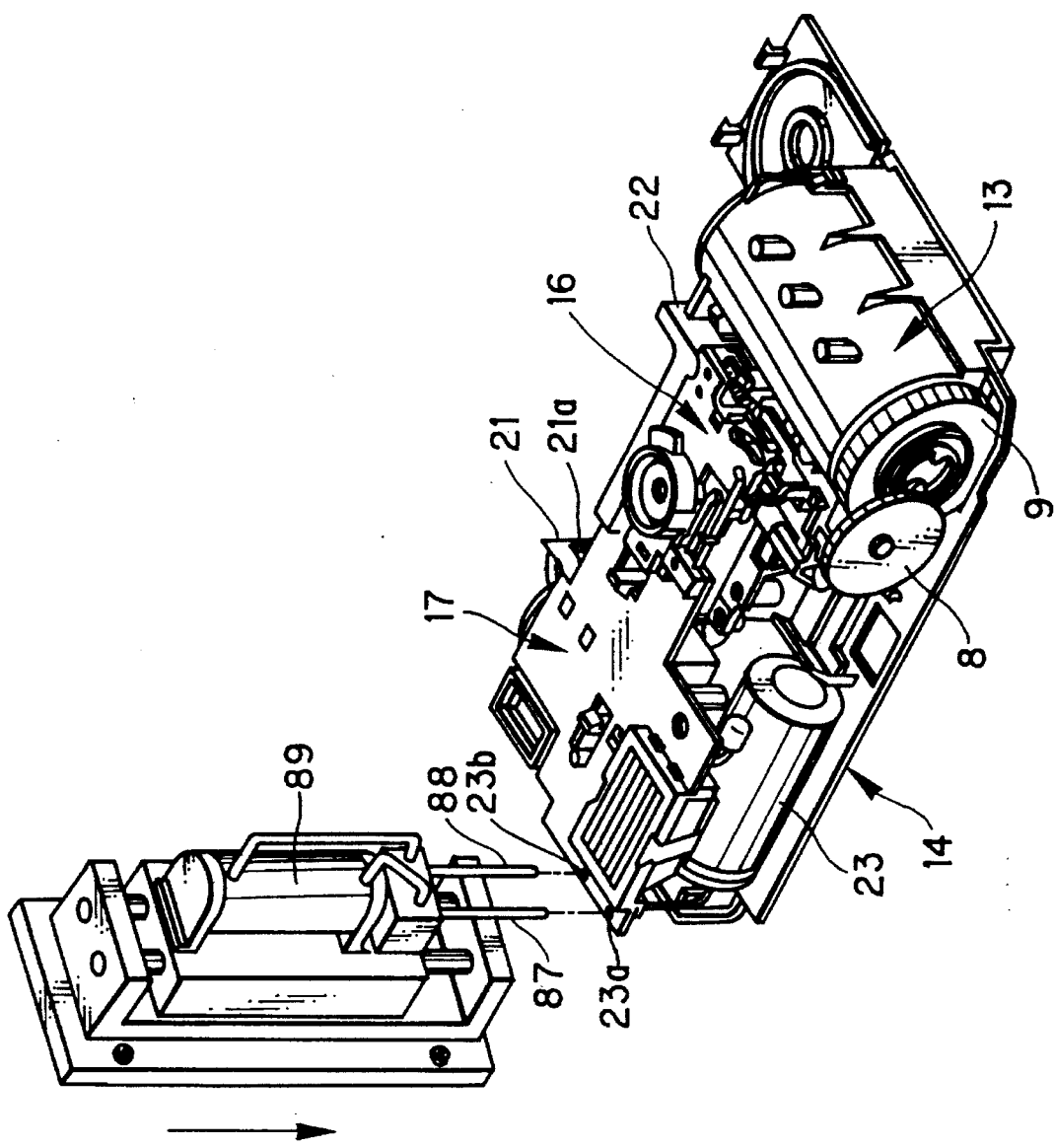
FIG. 8 is an explanatory view, in perspective, illustrating a station for discharging a flash device.

The fourth station, as illustrated in FIG. 8, is provided with an automatic device for discharging the electricity stored in the main capacitor 23 of the flash device 17. The discharge device has a discharge-adapted resistor 89 connected to a pair of discharge terminals 87 and 88. A cylinder (not shown) lowers the resistor 89 vertically so as to bring the discharge terminals 87 and 88 into respective contact with terminals 23a and 23b of the main capacitor 23. The terminals 23a and 23b are disposed with soldering on the face of the circuit board 18 together with the relevant circuits.

Figure 9:
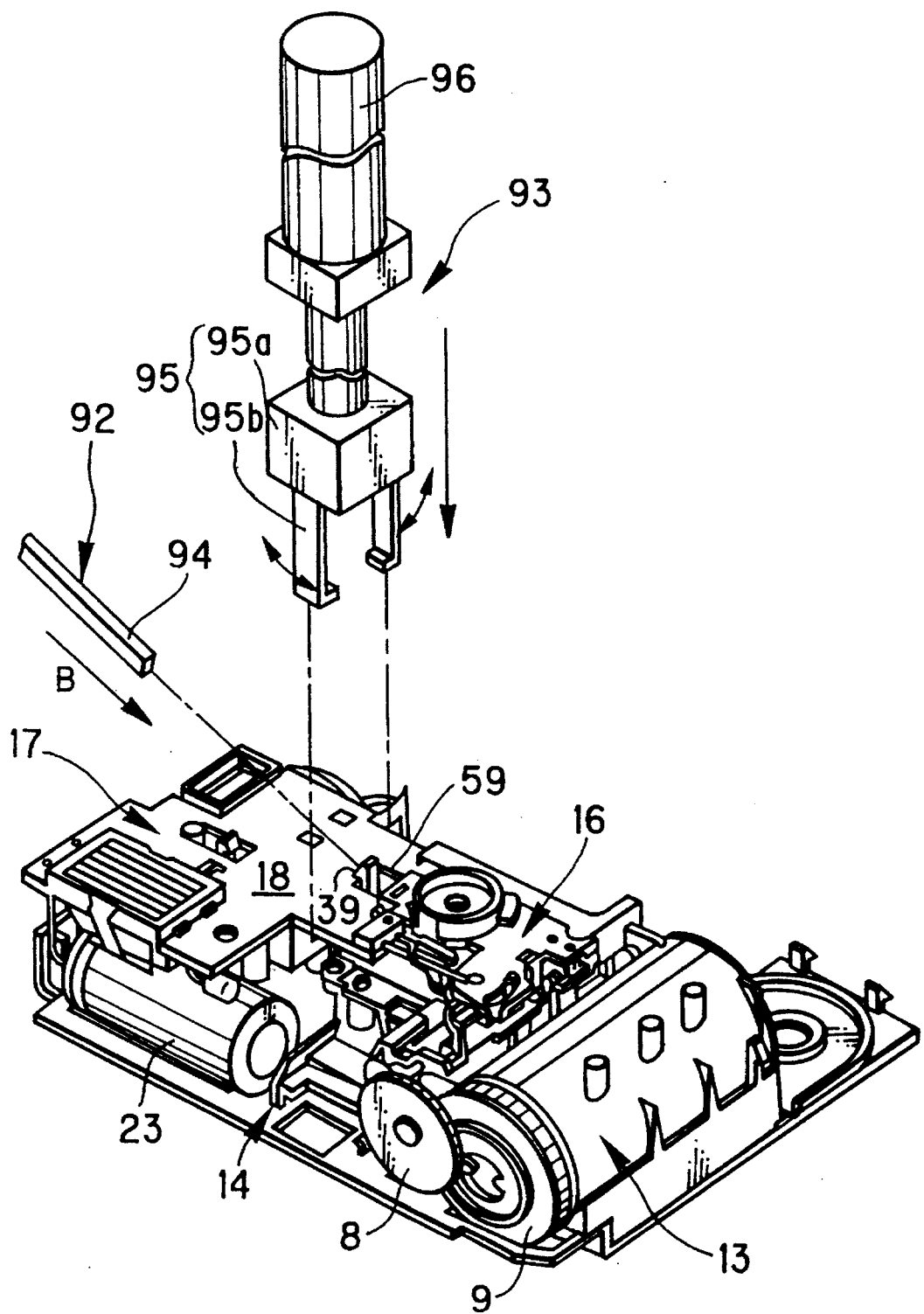
FIG. 9 is an explanatory view, in perspective, illustrating a station for removing the flash device.

The fifth station, as illustrated in FIG. 9, is provided with an automatic device for removing the flash device 17 from the photo film containing section 13. The automatic device has a releasing mechanism 92, which disengages the hole 59 in the flash device 17 from the hook 39 of the photo film containing section 13. A support mechanism 93, while the releasing mechanism 92 performs disengagement, supports the circuit board 18 on its opposite edges, and raises the board 18. The releasing mechanism 92 is caused by a cylinder (not shown) or the like to advance an access bar 94 in the direction B, so as to flex the hook 39. The support mechanism 93 is constituted of a robot hand 95 and a cylinder 96 which supports the robot hand 95 movably in the vertical direction. The robot hand 95 consists of a grasping drive structure 95a, and a pair of grasping fingers 95b driven by the former so as to shift between an open position and position of grasping the circuit board 18.

Figure 10:
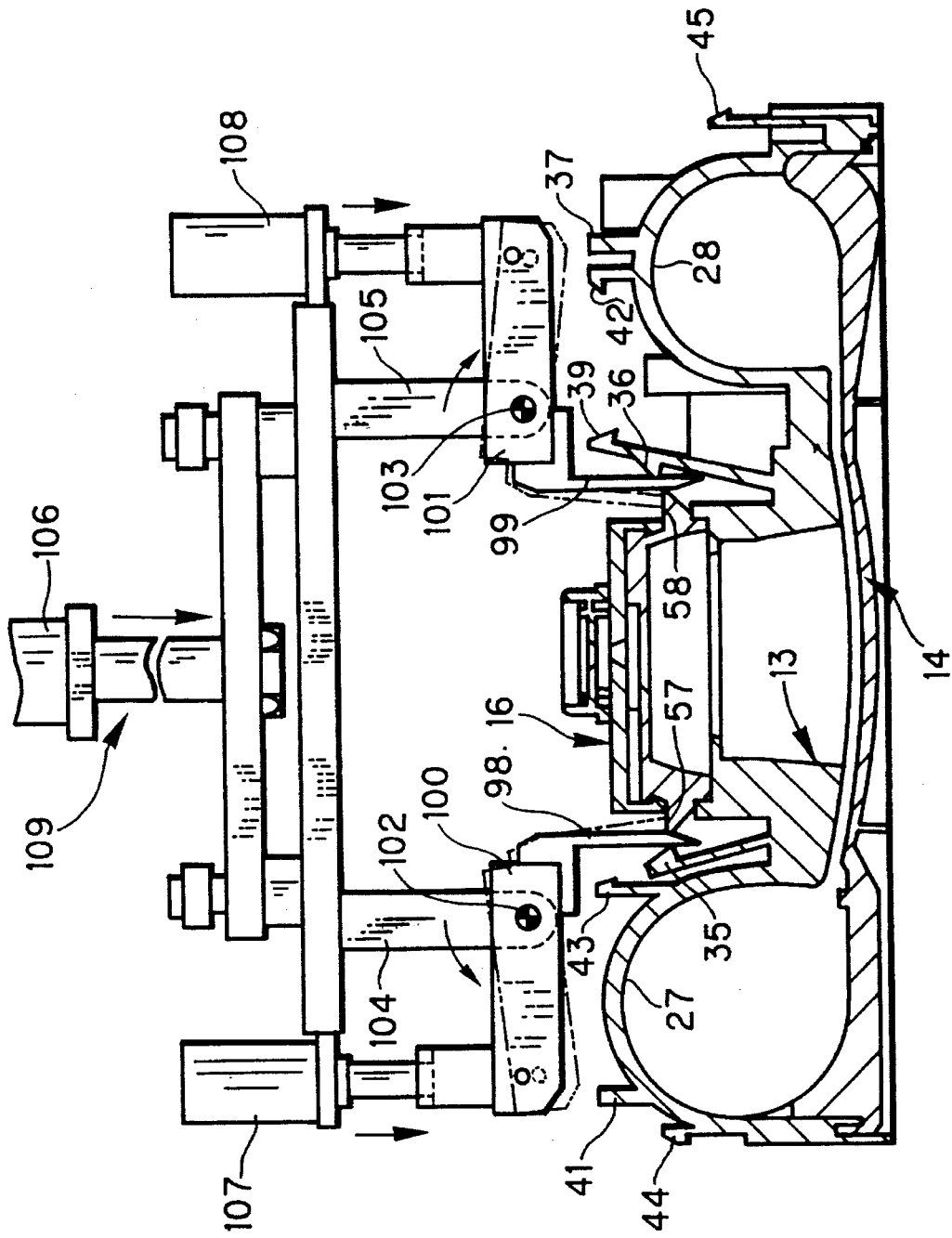
FIG. 10 is an explanatory view, in elevation, illustrating a station for removing an exposure section.

The sixth station, as illustrated in FIG. 10, is provided with a releasing/holding mechanism 109 (an access device) constructed for automatically removing the exposure section 16 (a second part) from the photo film containing section 13 (a first part). Access plates 98 and 99 are spaced in correspondence with the interval between the positions of the hooks 35 and 36, in other words the interval between the retaining portions 57 and 58 (first portions) engaged with the hooks 35 and 36. Two holders 100 and 101 support the respective access plates 98 and 99 in the vertical direction. The holders 100 and 101 are supported on respective support members 104 and 105 rotatably at shafts 102 and 103. The releasing/holding mechanism 109 has a rectilinearly moving cylinder 106 which moves the support members 104 and 105 in the vertical direction. The releasing/holding mechanism 109 also has a rotation generating cylinders 107 and 108 which rotates the support members 104 and 105.

The operation of the disassembling apparatus is now described. A manufacturer of the photo film unit withdraws the photo film unit 2 from the photofinisher into the factory, and conveys the photo film unit 2 through the disassembling stations. The first station removes the packaging 4 from the photo film housing 3 of the photo film unit 2. The photo film housing 3 after the removal is sent to the second station. The packaging 4 as removed is recycled, e.g. regenerated as used cardboard for the reuse in packaging.

When the assembling pallet AP is conveyed to the second station, the releasing/holding mechanism 66 and the releasing mechanism 67 and 68 are actuated all simultaneously, as illustrated in FIGS. 4 and 5. The releasing mechanisms 67 and 68, in response to operation of the associated cylinders, insert the unhooking rods 79 and 80 into holes 51 and 52 at the hooks 44 and 45. The unhooking rods 79 and 80 flex the hooks 44 and 45 while disengaging the hooks 44 and 45 from the holes 51 and 52 in the front cover 15. The releasing/holding mechanism 66 operates the rectilinearly moving cylinder, and lowers the access plates 69 and 70, which are inserted through the through holes 53 and 54 and into gaps, respectively between the hooks 42 and 49 and the hooks 43 and 50. The hooks 42 and 43 are flexed in outward directions, and allow disengagement of the hooks 49 and 50 on the front cover 15.

Note that the disengagement of the hooks 49 and 50 can be performed by successive steps of: moving the unhooking rods 79 and 80 straight into the holes 51 and 52, and then moving the unhooking rods 79 and 80 outward in reverse to the flexure of the hooks 44 and 45. Instead of the above, the access plates 69 and 70 can be inserted into the gaps to flex not only the hooks 42 and 43 but also the hooks 49 and 50. It is also to be noted that motion of the unhooking rods 79, 80 and the access plates 69, 70 during the insertion can be not only straight but also rotational.

After the unhooking rods 79 and 80 are inserted in a straight manner, the releasing/holding mechanism 66 actuates the cylinder 77. The cylinder 77 causes the holder 71 and 72 to rotate around the shafts 73 and 74 respectively, and rotates the access plates 69 and 70 in reverse to the flexure of the hooks 42 and 43. This causes the access plates 69 and 70 to support the front cover 15, with force to raise the front cover 15 apart from the photo film containing section 13. The unhooking rods 79 and 80 having depressed the hooks 44 and 45 are withdrawn fully in reverse by the cylinders, and are kept from contact with the front cover 15 at the holes 51 and 52. The releasing/holding mechanism 66 actuates the rectilinearly moving cylinder, and raises the access plates 69 and 70 in reverse to the insertion into the front cover 15, while the front cover 15 remains supported by the access plates 69 and 70. Note that, after the removal of the front cover 15, the taking lens 5 and contact segment 25 are removed. Although the access plates 69 and 70 are rotated while pressing the hooks 49 and 50, alternatively the access plates 69 and 70 can be linearly shifted in a straight manner to press the hooks 49 and 50, for which a known straight shifting device can be used and constructed for movement of the access plates 69 and 70.

The assembling pallet AP is then conveyed to the third station. As illustrated in FIG. 6, the cylinder 83 is actuated and advances the insert 81 and the ejector 82 in the direction A. After the advancement, the insert 81 is inserted between the terminal plate 21 and the electrode 20a of the battery 20, and disengages the electrode 20a from the opening 21a. The ejector 82 is situated over the battery 20 as illustrated in FIG. 7. The cylinder 85 is operated to rotate the ejector 82 around the shaft 84. The battery 20 is thus removed by the ejector 82 and pushed into a receptacle 110 disposed on the assembling pallet AP.

The assembling pallet AP is then conveyed to the fourth station. As illustrated in FIG. 8, the cylinder is operated to lower the resistor 89. After the movement, the terminals 87 and 88 contact the terminals 23a and 23b of the main capacitor 23. It is preferable, when the main capacitor 23 has capacity of 180 µF and the resistor 89 has resistance of 200 Ω, to set contact time of the resistor 89 to be 0.5 second. This operation of electrical discharge makes it possible to handle the flash device 17 with safety.

The assembling pallet AP is then conveyed to the fifth station. As illustrated in FIG. 9, the cylinder of the releasing mechanism 92 is operated to move the access bar 94 in the direction B. After the movement, the access bar 94 flexes the hook 39 of the photo film containing section 13. The grasping fingers 95b are kept open by the drive structure 95a, to have an interval wide enough to grasp the circuit board 18 of the flash device 17. The cylinder 96 of the support mechanism 93 is operated, rectilinearly to lower the robot hand 95 while set open in the position. Upon this movement, the robot hand 95 is so placed as to situate the circuit board 18 between the grasping fingers 95b. The drive structure 95a shifts the grasping fingers 95b to come closer to each other in the position of grasping the circuit board 18. The cylinder 96 is then actuated with the grasping fingers 95b shifted, so as to raise the circuit board 18, but only to a small height. During the small rise, the hook 39 having been disengaged by access bar 94 is kept disengaged by the inside of the hole 59. The cylinder of the releasing mechanism 92 is then actuated to withdraw the access bar 94 completely from the circuit board 18. The robot hand 95 afterwards rises to raise the flash device 17 having the circuit board 18, without being blocked by the access bar 94. The flash device 17 separated from the photo film containing section 13 is conveyed to a station for inspection for the purpose of reuse in a new photo film unit.

The assembling pallet AP is then conveyed to the sixth station. The releasing/holding mechanism 109 is actuated, as illustrated in FIG. 10. The releasing/holding mechanism 109 operates the rectilinearly moving cylinder 106, and lowers the access plates 98 and 99, in a straight, manner which are pressed into gaps respectively between the hook 35 and the retaining portion 57 and the hook 36 and retaining portion 58. The hooks 35 and 36 are thus flexed in outward directions, and allow disengagement of the retaining portions 57 and 58 on the exposure section 16. The releasing/holding mechanism 109 actuates the cylinders 107 and 108, which cause the holders 100 and 101 to rotate around the shaft 102 and 103, and rotate the access plates 98 and 99 in reverse to the flexure of the hooks 35 and 36. This causes the access plates 98 and 99 to support the exposure section 16, and raises the exposure section 16, but only to a small height. During the small rise, the releasing/holding mechanism 109 actuates the rectilinearly moving cylinder 106, and raises the access plates 98 and 99 in reverse to the access to the exposure section 16, while the exposure section 16 remains supported by the access plates 98 and 99.

The exposure section 16 after the removal is conveyed to the inspecting station, inspected, and sent to a line for reassembling photo film units. The photo film containing section 13 still engaged with the rear cover 14 is sent to a line for a resin regenerating process, because the photo film containing section 13 has been already emptied of the cassette and does not include any mixture of different resins. The retaining hooks to be flexed by the access members of the removing devices are all formed on the photo film containing section 13 in deformable fashion. Even damage of the retaining hooks would not affect the moldability of the resin of the photo film containing section 13. Note that the front cover 15, the contact segment 25 and the taking lens 5 are sent to respective lines of regenerating resins and regenerating metal, separately with respect to the differences in material thereof.

In the above embodiments, the exposure section 16 is coupled to the photo film containing section 13 by use of engagement of the hooks 35 and 36 with the retaining portions 57 and 58. Additionally, the engagement for such coupling can be further reinforced by ultrasonic welding, according to which an ultrasonic welding apparatus is used for contact faces of the hooks and the retaining portions. Should the above removing device be used for detachment of ultrasonically reinforced engagement of the hooks 35 and 36 and the retaining portions 57 and 58, the removing device might fail to separate the exposure section 16 from the photo film containing section 13. For adaptation to the use of ultrasonic welding, it is preferable to construct the relevant removing device additionally with a grasping mechanism, which, after a releasing mechanism like the mechanism 109 disengages the hooks 35 and 36, can grasp the exposure section 16 firmly so as to raise and separate it from the photo film containing section 13.

Note that the main capacitor 20 may be discharged by a device integrated with the station for removing the flash device 17. In this station, the flash device 17 preferably can be removed after the discharge of the flash device 17.

Note that the second and sixth stations in the above embodiment relate to disassembly of the film unit in which the film containing section has a hook formed integrally, and a front part has a hooking portion formed integrally, the hooking portion retained on the hook so as to couple the front part to the film containing section. The removing operations adapted thereto respectively comprise steps of: inserting an access plate between the hook and a hooking portion so as to flex the hook until the hooking portion is disengaged; shifting the access plate in a direction retracting to the flexure, so as to capture the front part; and retracting the access plate while the access plate is shifted in reverse to the flexure, so as to remove the front part from the film containing section.

In spite of the above, the present invention is applicable to disassembly of a film unit in which a front cover has a hook formed integrally, and a film containing section has a hole formed therein, the hole retained on the hook so as to couple the film containing section to the front cover. A removing method adapted thereto can comprise steps of: pressing the hook by use of an access mechanism so as to disengage the hook from the hole; capturing the front cover while the access mechanism presses the hook; retracting the access mechanism from the film containing section with the front cover captured, while the hook is pressed, so as to remove the front cover from the film containing section.

Figure 11:
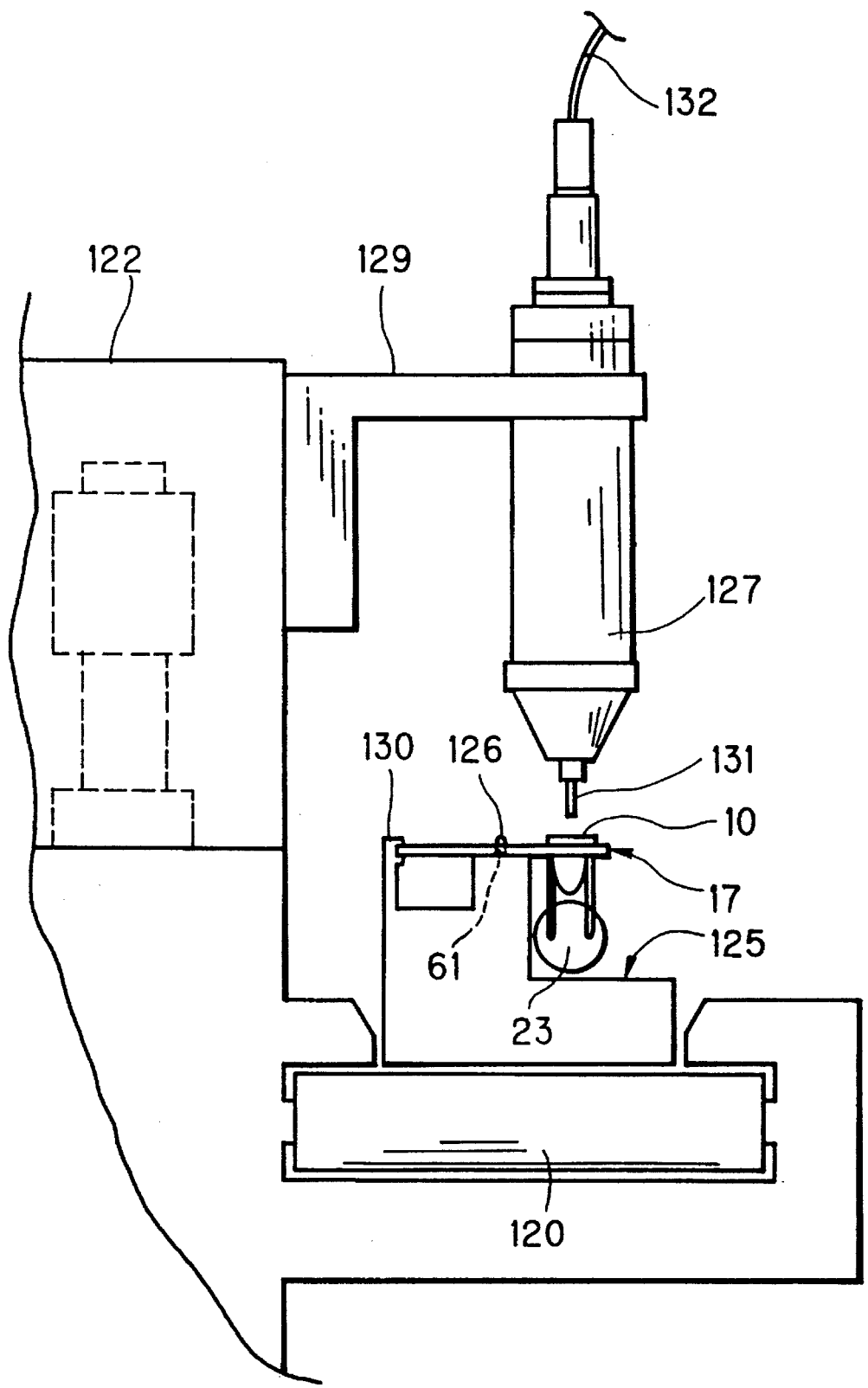
FIG. 11 is an explanatory view, in elevation, illustrating a station for spraying cleanser liquid on a flashing face.

The flash emitting section is exposed externally from the photo film unit 2 during use, so that, after withdrawal of used photo film units, dirt is frequently stuck on the transparent flashing face 10 covering the flash tube. Recycling flash devices results in failure, should dirt on the flashing face lower a light amount, or should reuse of an apparently dirty flash device give a purchaser an impression of low quality. An embodiment for solving such problems is now described, referring to FIGS. 11 to 13. A conveyer belt 120, in FIG. 13 depicting overall arrangement of a flash cleansing line, is moved to the right by a known belt drive mechanism. Along the conveyer belt 120 are arranged a flash supply station 121, a spray or jet station 122, a cleaning station 123, and a flash exit station 124. On the belt 120 is disposed a pallet 125 for positioning and supporting the flash device 17. As illustrated in FIG. 11, the positioning opening 61 formed in the flash device 17 is received on a pin 126 formed on the pallet 125, to position precisely the flash device 17 on the pallet 125. The left end of the pallet 125 has a retaining claw 130 for retaining the flash device 17 fixedly.

FIG. 11 illustrates the spray station 122 for spraying or jetting cleanser liquid. A cleanser spraying or jetting device 127 is supported on an arm 129 of the spray station 122, and is adjustable to set a spraying or jetting head 131 over the flashing face 10. A tube for the spray device 127 has a nozzle 132, through which the cleanser liquid is supplied constantly for the spray device 127. The flash coverage constituting the flashing face 10 is formed of transparent acrylic resin, for which a preferable cleanser liquid is volatile alcohol, such as methyl alcohol, ethyl alcohol and isopropyl alcohol. The cleanser liquid as supplied is pressurized by a known mechanism accommodated in the spray device 127, and sprayed through the spray head 131 at approximately the amount of $0.01 \text{ cm}^3$.

Figure 12:
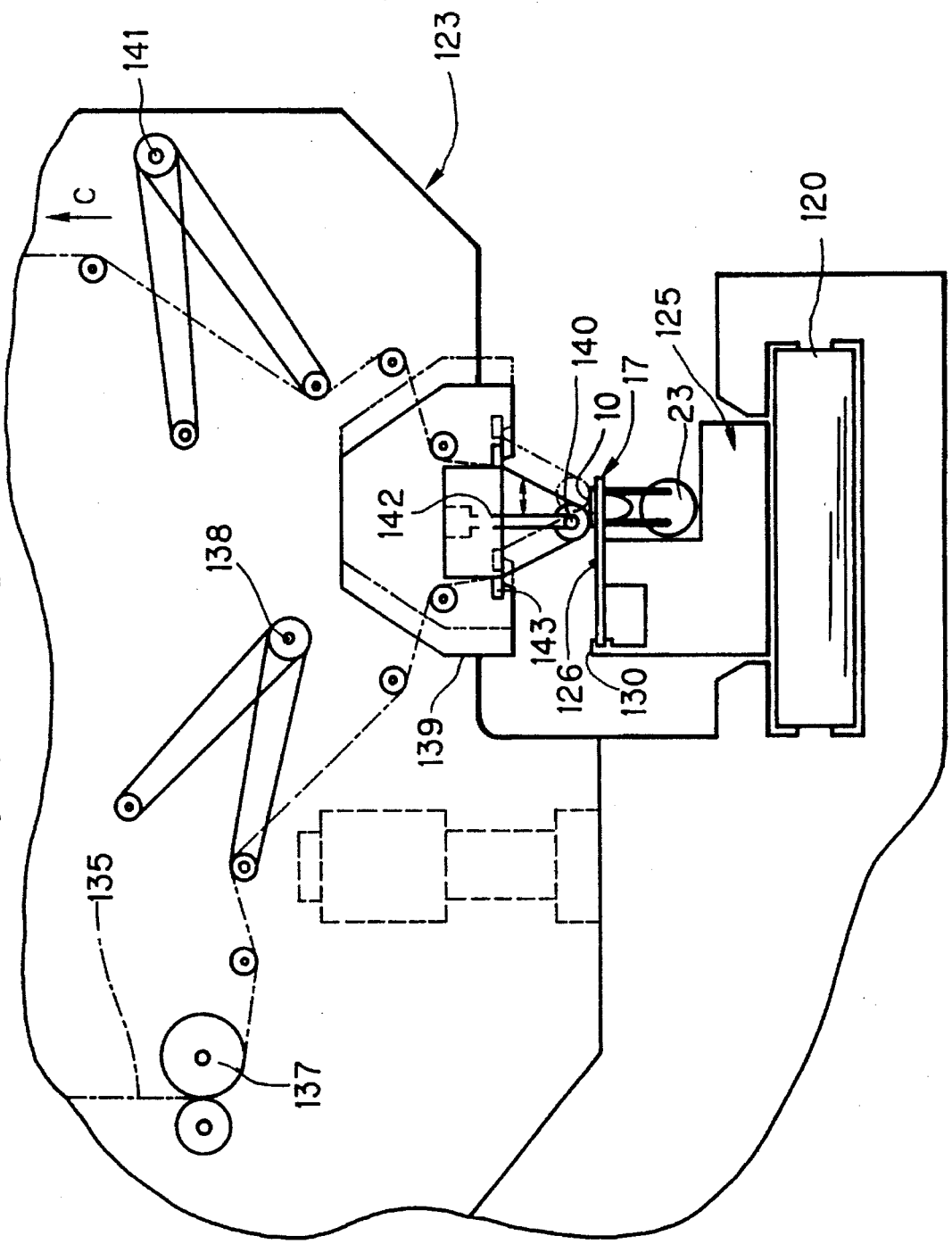
FIG. 12 is an explanatory view, in elevation, illustrating a station for wiping the flashing face.
Figure 13:
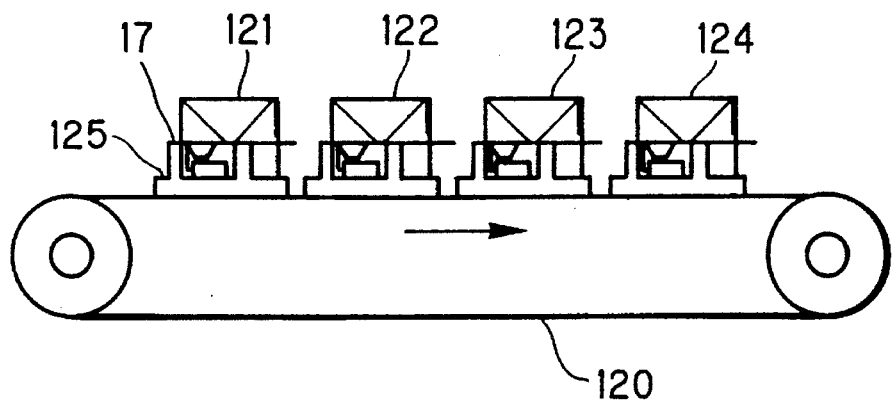
FIG. 13 is an explanatory view, in elevation, schematically illustrating a line arranged for cleansing the flashing face.

FIG. 12 illustrates the cleaning station 123, in which cleaning tape 135 is fed from a tape roll (not shown) contained at the cleaning station 123. The tape 135 is drawn out by a pair of feeding rollers 137, adjusted under tension of a tension controller 138, and supplied to a cleaning head 140, which is disposed under a head support member 139. The tape 135 as used at the cleaning head 140 is moved to a tension controller 141 and wound into a tape winder (not shown).

The cleaning head 140 is supported on an arm 142 on the head support member 139, and is vertically slidable. In addition, the head support member 139 is horizontally slidable so as to slide the head cleaning head 140 horizontally. The tape 135 is continuous non-woven fabric having a width of one inch. The cleaning head 140 consists of a rubber lining roller so constructed as to avoid scratching the tape 135 and the flashing face 10. Two mouths in the head support member 139 for passing the tape 135 are provided with respective tape clampers 143, which clamps portions of the tape 135 both before and past the head 140, so as to keep the tape 135 in contact with the head 140 without deviation even after reciprocal movement of the cleaning head 140.

The operation of the above-constructed flash cleansing line is now described. The flash device 17 after being disassembled from the photo film unit 2 is brought in the flash supply station 121, where a supply robot captures the flash device 17. The initially empty pallet 125 is provided with the flash device 17, which is so positioned as to engage the opening 61 with the pin 126, and placed with the main capacitor 23 to the bottom and with the flashing face 10 to the top. A lateral edge of the circuit board 18 is retained on the retaining claw 130, so as to hold the flash device 17 fixedly on the pallet 125.

The flash device 17 on the pallet 125 is moved by the conveyer belt 120 stepwise, and first conveyed to the spray station 122. In response to arrival of the flashing face 10 at the spray head 131 of the spray device 127, the conveyer belt 120 with the pallet 125 is stopped. Upon the stopping of the belt 120, the cleanser liquid is sprayed through the spray head 131 and spreads on the flashing face 10. Note that the pressure of spraying the cleanser liquid can be adjusted suitably as desired, so that the cleanser can be spread on the flashing face 10 in favorably even fashion. Although the present embodiment sprays the cleanser liquid, alternatively cleanser liquid may be simply dripped on the flashing face 10. In consideration of the construction of dripping, the type and amount of cleanser liquid to be used can be selected and determined in view of characteristics suitable for the dripping operation. The dripping, as compared with the spraying or jetting, can be performed by use of a simpler supply device which costs less.

With the cleanser liquid sprayed on the flashing face 10, the flash device 17 is further moved stepwise on the belt 120, and conveyed to the cleaning station 123. The movement from the spraying station 122 to the cleaning station 123 inevitably takes one second, the lapse of which is effective in spreading the cleanser naturally. In response to arrival of the flashing face 10 at the cleaning head 140 on the head support member 139, the conveyer belt 120 with the pallet 125 is stopped. Upon the stopping of the belt 120, the arm 142 of the head support member 139 is advanced down to the flash device 17, until the cleaning head 140 presses the tape 135 against flashing face 10.

While the cleaning head 140 presses the flashing face 10 via the tape 135, the head support member 139 is moved horizontally back and forth a small number of times. The tape 135 on the periphery of the cleaning head 140 wipes and cleanses the flashing face 10. The tension at which the tape 135 is stretched is regulated by the tension controllers 138 and 141, constantly while the cleaning head 140 is being lowered and moved reciprocally. The position of the tape 135 along the width is reliably prevented from being shifted, while clamped by the clampers 143 on the head support member 139.

After cleaning, the cleaning head 140 is raised by the arm 142. The tape 135 is fed in the direction C in FIG. 12 by a predetermined length. An unused portion of the tape 135 comes to, and contacts the periphery of, the cleaning head 140, to stand by for one other flash device to be cleansed.

The flash device 17 after cleaning of the flashing face 10 is moved by the conveyer belt 120 stepwise, and conveyed to the exit station 124. In response to arrival of the flash device 17 at an exit, the conveyer belt 120 with the pallet 125 is stopped. Upon the stopping, the edge of the circuit board 18 is disengaged from the retaining claw 130 of the pallet 125, to unfasten the flash device 17 inside the exit station 124. An arm of a removing robot captures the flash device 17 and removes it from the pallet 125. The flash device 17 as removed after all the cleansing operation is treated in the inspecting step, which selects acceptable flash devices to be reused in new photo film units. The pallet 125 after the removal of the flash device 17 is conveyed again to the supply station 121, in which one other flash device 17 as removed is placed to be cleansed.

Figure 14:
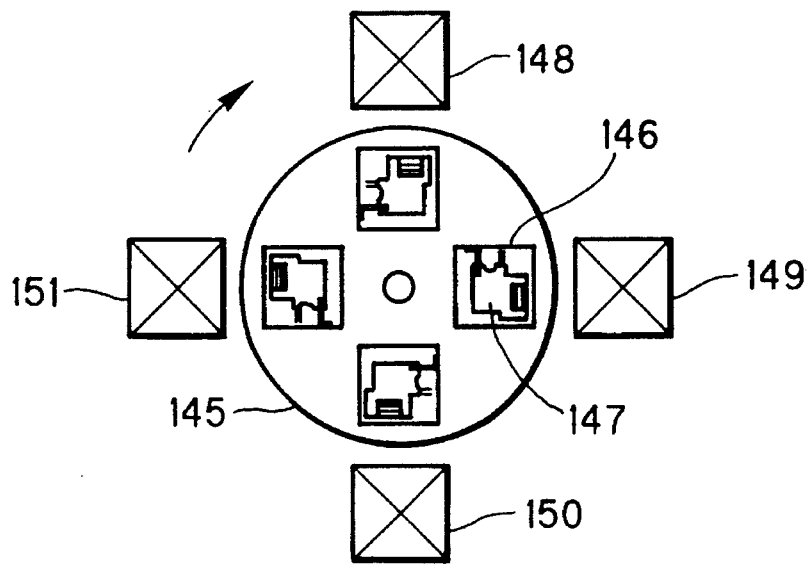
FIGS. 14 and 15 are explanatory views, in plan views, schematically illustrating other preferred arrangement for cleansing a flashing face.

Although the above embodiment is constructed with the linear arrangement of the flash cleansing line as seen in FIG. 13, alternatively a flash cleansing line can be arranged in circular fashion, as illustrated in FIG. 14. A turntable 145 is disposed to rotate stepwise in the clockwise direction. Four pallets 146 are arranged on the turntable 145 regularly at right angles, for placing a flash device 147 thereon. Over the turntable 145 are arranged a flash supply station 148, a spray station 149, a cleaning station 150, and a flash exit station 151, regularly at right angles and clockwise in the order listed. The pallet 146, after the removal of the flash device 147 in the exit station 151, is conveyed again to the supply station 148, with highly great convenience in the circular arrangement in the present embodiment, as compared with the former embodiment.

Figure 15:
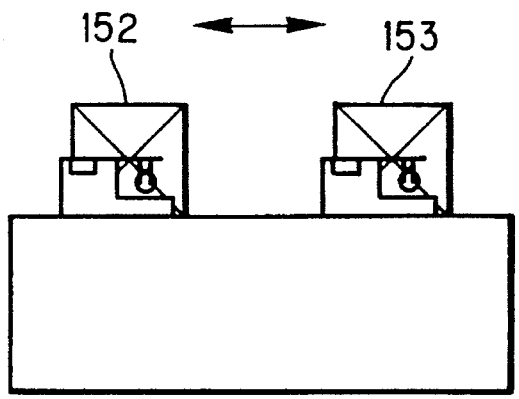

A flash cleansing line can be arranged in simplified fashion by use of reciprocal movement, as illustrated in FIG. 15. Two stations 152 and 153 are arranged horizontally, of which the former constitutes a spray station and is further used for a flash supply step and a flash exit step, and the latter constitutes a cleaning station. The flash device 17 is manually handled for placement on the spray station 152 before spraying. Then automatic operation starts, so that flash device 17 is sprayed, moved forth to the cleaning station 153, cleaned while wiped, and moved back to the spray station 152. The flash device 17 is again manually handled for removal from the spray station 152 after cleaning. This flash cleansing line is semi-automatic and advantageous in simplification of recycling facilities.

Figure 16:
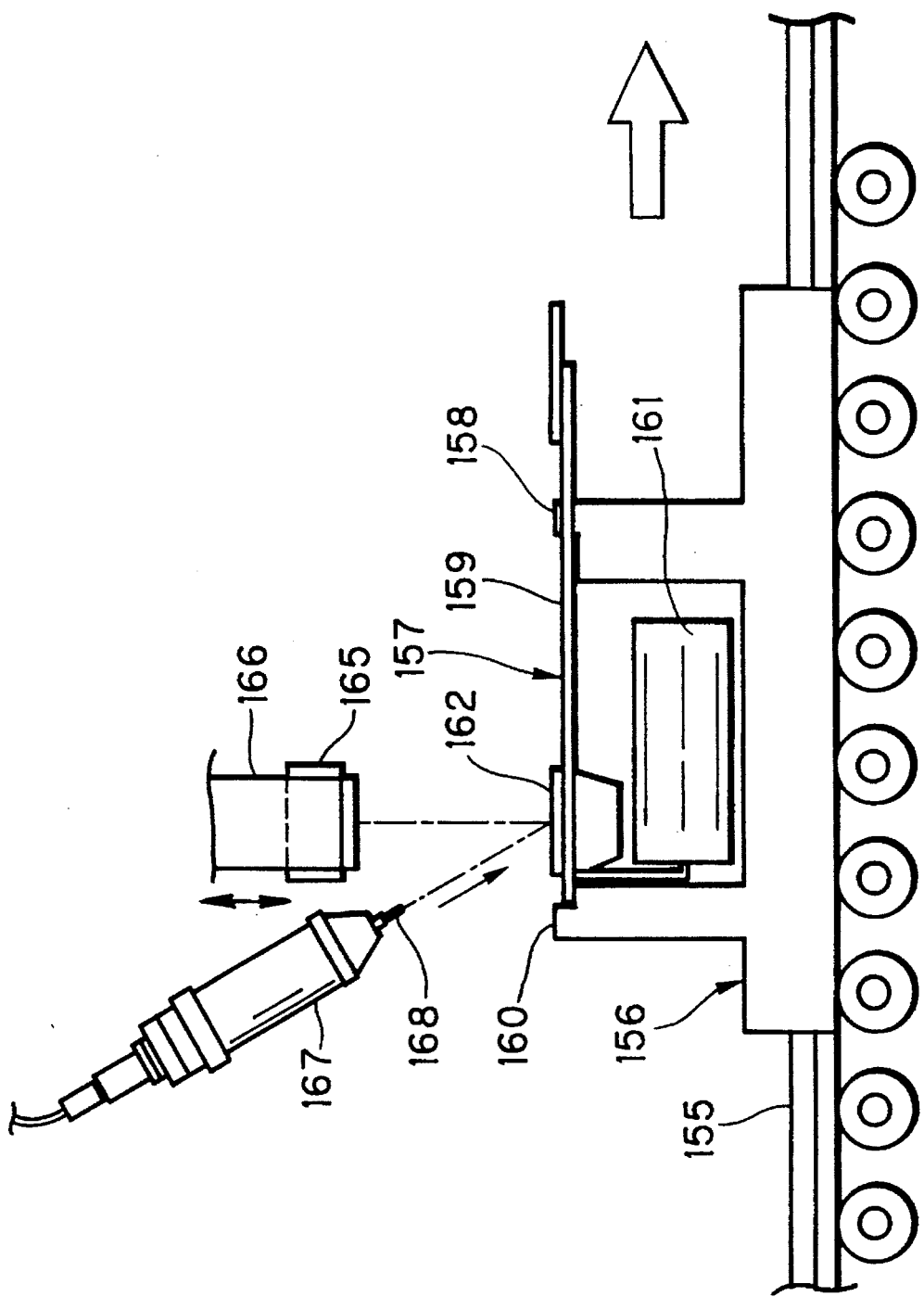
FIG. 16 is an explanatory view, in side elevation, illustrating another preferred flash cleansing station.

FIG. 16 illustrates another preferred embodiment of the present invention. There are disposed a cleaning head 165 and a cleanser spraying device 167 in a position adjacent to the cleaning head 165 in a slant orientation, both being part of a unified cleansing station. A spray head 168 of the spray device 167 is directed to a flashing face 162 as positioned in the cleansing station. The cleansing line is characterized in that the cleaning head 165 operates for a flash device 157 immediately after the cleanser is sprayed, without displacement of the flash device 157. Note that the present embodiment is applicable not only to the linear arrangement of conveyance like FIG. 13 but also to a turning arrangement of conveyance like FIG. 14. In FIG. 16, reference numerals 155 designates a conveyer belt, and 156 a pallet. A projection 158 positions an opening in a circuit board 159, which is retained by a retaining portion 160. Reference numeral 161 designates a main capacitor.

Figure 17:
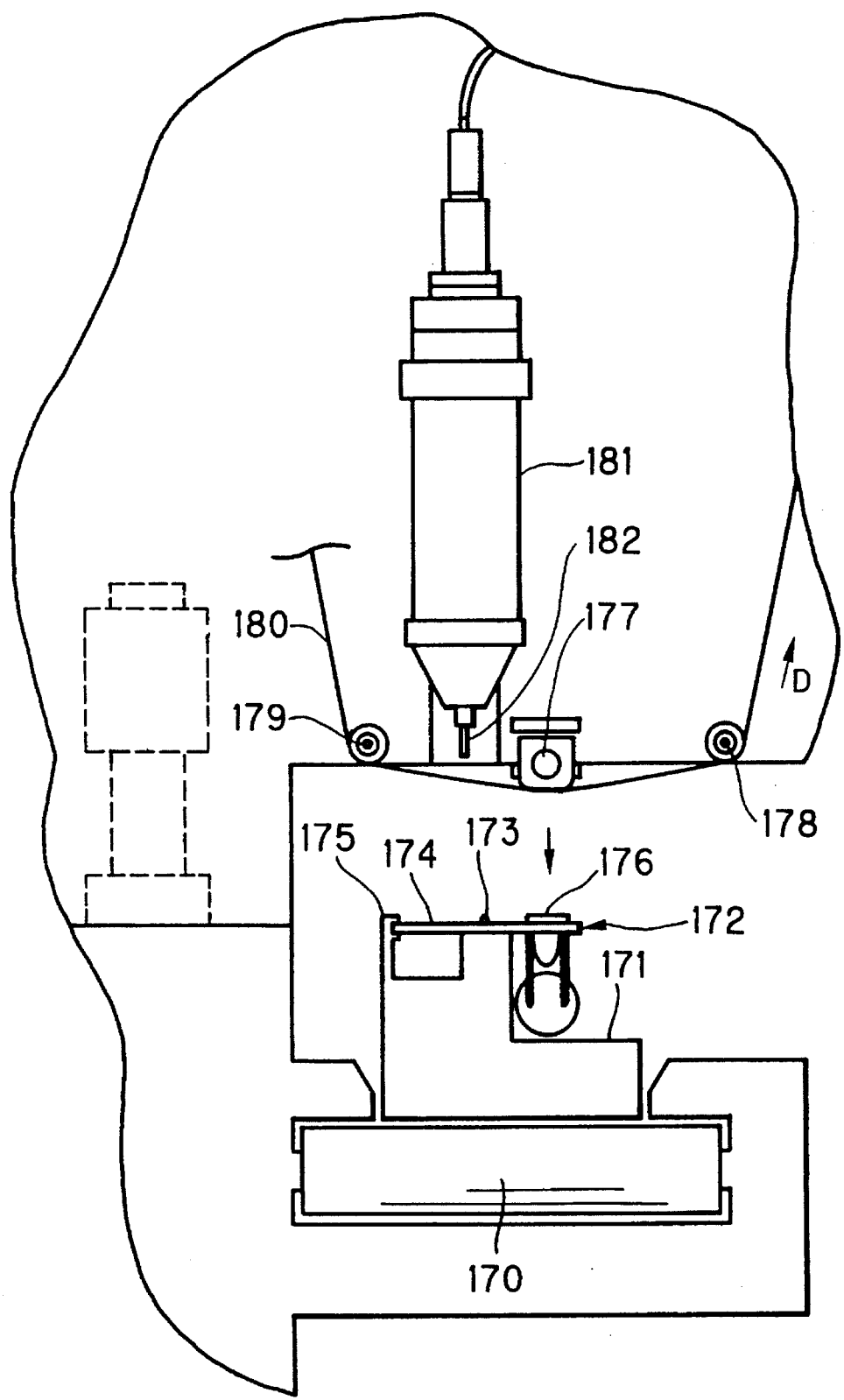
FIG. 17 is an explanatory view, in elevation, illustrating still another preferred flash cleansing station.

FIG. 17 illustrates still another preferred embodiment. There are disposed a cleaning head 177 and a cleanser spraying or jetting device 181 in a position adjacent to the cleaning head 177, both in a single cleansing station. A spraying or jetting head 182 of the spray device 181 is directed to cleaning tape 180 and upstream from the cleaning head 177. The cleansing line is characterized in that the cleanser from the spray head 182 is sprayed on an upper face of the tape 180, so as to permeate even a lower face of the tape 180. Note that tape 180 is shaped to be a endlessly usable loop, and is renewed after repeated use.

The cleaning head 177, in response to a stopping of a belt 170, is lowered to press the tape 180 on a flashing face 176. Then a predetermined amount of cleanser liquid is sprayed or jetted by the spray head 182 on the tape 180 to wet the tape 180. The tape 180 is then moved in the direction D, while pressed against the flashing face 176, so as to wipe the flashing face 176 in a sufficiently wetted state.

Reference numeral 171 designates a pallet, on which a flash device 172 is placed. A projection 173 positions an opening in a circuit board 174, which is retained by a retaining portion 175. Between rollers 178 and 179 supporting the tape 180, the tape 180 is supported to contact the cleaning head 177.

Although the upper face of the tape 180 is sprayed with the cleanser in the above embodiment, alternatively the lower face of the tape 180 may be sprayed or jetted. Although the cleanser is sprayed before the movement of the tape 180 in the above embodiment, alternatively cleanser liquid may be sprayed or jetted during and/or before the movement of the tape 180. Although the tape 180 above is looped for endless operation, alternatively cleaning tape may be formed to be a simple strip wound as a roll on a feeding reel, from which the tape may be fed toward a take-up reel. The present embodiment is applicable not only to the linear arrangement of conveyance like FIG.

What is claimed is:

1. A method for disassembling a used lens-fitted photo film unit inclusive of first and second parts, said first part having a retaining device formed integrally thereon, and said second part having a first portion formed integrally thereon and retained on said retaining device so as to couple said second part to said first part, said disassembling method comprising steps of:

setting said photo film unit in a disassembling station in a predetermined orientation;

advancing an access device toward said photo film unit in response to a signal from a control unit;

by use of said access device, flexing said retaining device away from said first portion and capture said second part with said access member in response to a signal from a control unit; and retracting said access device while said second part is captured by said access device in response to a signal from a control unit, so as to remove said second part from said first part.

2. A disassembling method as defined in claim 1, wherein said access device disengages said retaining device from said first portion by being inserted between said retaining device and said first portion.

3. A disassembling method as defined in claim 2, wherein said second part is captured by shifting said access device in a direction which is toward said first portion.

4. A disassembling method as defined in claim 3, wherein said retaining device comprises a pair of retaining members, said first portion comprises a pair of first portions, said access device comprises a pair of access members, and said second part is captured by moving said access members toward each other.

5. A disassembling method as defined in claim 4, wherein said access members are plates of which an end is tapered.

6. A disassembling method as defined in claim 5, wherein said retaining members and said first portions are respectively shape like hooks to be engaged one with another.

7. A disassembling method as defined in claim 6, wherein said first part is a photo film containing section of said photo film unit, and said second part is a front cover for covering a front of said photo film containing section.

8. A disassembling method as defined in claim 7, wherein said second part has through holes formed therein, said first portions are defined at said holes, and said access members are inserted through said holes to pass between said retaining members and said first portions.

9. A disassembling method as defined in claim 6, wherein said first part is a photo film containing section of said photo film unit, and said second part is an exposure section secured in front of said photo film containing section.

10. A disassembling method as defined in claim 1, wherein, in said photo film unit, said first part has a second retaining member formed integrally thereon, and a third part has a second portion formed integrally thereon and retained on said second retaining member so as to couple said third part to said first part; and said method further comprises the steps of:
pressing said second retaining member by use of a second access member so as to release said second portion in response to a signal from control unit;

advancing to said third part a capturing device adapted to capturing said third part in response to a signal from a control unit;

displacing said capturing device to a capturing position where said third part is captured in response to a signal from a control unit; and retracting said capturing device from said first part with said third part captured, while said second retaining member is pressed, so as to remove said third part from said first part in response to a signal from a control unit.

11. A disassembling method as defined in claim 10, wherein during said retracting step said capturing device is retracted from said first part at a small distance while capturing said third part, said second access member is retracted while said second retaining member is pressed and flexed by said second portion without retention between said second retaining member and said second portion, and afterwards said capturing device is completely retracted from said first part.

12. A disassembling method as defined in claim 11, wherein said second access member is shaped like a bar.

13. A disassembling method as defined in claim 12, wherein in said capturing device comprises a pair of capturing members, which have respective distal ends to be projected toward one another when standing in said capturing position, in order to contact two opposite edges of said third part so as to capture said third part.

14. A disassembling method as defined in claim 13 wherein in said second retaining member is shaped like a hook, and said second portion is a recess formed in said third part.

15. A disassembling method as defined in claim 11, wherein said first part is a photo film containing section of said photo film unit, said second part is a front cover for covering a front of said photo film containing section, and said third part is a flash device disposed between said photo film containing section and said front cover.

16. A disassembling method as defined in claim 15 wherein said photo film unit has a battery chamber and a battery contained therein, first and second terminal members are disposed in said battery chamber to contact respectively a pair of electrodes of said battery, and said battery is fitted between said first and second terminal members to be retained in said battery chamber; and which method further comprises the steps of:
before moving said flash device from said photo film containing section, pressing said first terminal member in a direction apart from said battery in response to a signal from a control unit, by use of an insert member, so as to release said battery from being fitted on said first and second terminal members;

advancing an ejector member, in a direction which is diagonal with respect to a front surface of said film unit, toward an inside of said battery chamber in response to a signal from a control unit; and shifting said ejector member in response to a signal from a control unit while said first terminal member is pressed, so as to eject said battery from said battery chamber.

17. A disassembling method as defined in claim 15, which further comprises a step of, before said pressing step of said second retaining member, connecting a resistor to a pair of terminals of a main capacitor of said flash device, so as to short-circuit and discharge said main capacitor in response to a signal from a control unit.

18. A disassembling method as defined in claim 17, wherein said terminals of said main capacitor are arranged in front of said flash device, and short-circuited after said front cover is removed.

19. A disassembling method as defined in claim 15, wherein, in said photo film unit, said photo film containing section has a third retaining member formed integrally thereon, and a fourth part has a third portion formed integrally thereon and retained on said third retaining member so as to couple said fourth part to said photo film containing section; and which method further comprises the steps of:
inserting a third access member between said third retaining member and a third portion in response to a signal from a control unit so as to flex said third retaining member in a third direction where said third portion is released;

shifting said third access member in a fourth direction which is reverse to said third direction in response to a signal from a control unit, so as to capture said fourth part; and retracting said third access member while said third access member is shifted in a said fourth direction in response to a signal from a control unit, so as to remove said fourth part from said photo film containing section.

20. A disassembling method as defined in claim 19, wherein said fourth part is an exposure section secured in front of said photo film containing section.

21. A disassembling method as defined in claim 15, which comprises further steps of:

supporting said flash device so as to face upward a flashing face of said flash device;

automatically supplying cleanser liquid to said flashing face in response to a signal from a control unit;

automatically bringing cleaning tape in contact with said flashing face in response to a signal from a control unit; and automatically moving said tape relatively to said flashing face while keeping said tape in contact with said flashing face in response to a signal from a control unit, so as to wipe and cleanse said flashing face.

22. A disassembling method as defined in claim 21, wherein said cleanser liquid comprises a volatile alcohol.

23. A disassembling method as defined in claim 21, wherein said tape is a non-woven fabric.

24. A disassembling method as defined in claim 21, wherein said cleanser liquid is one of dripped, sprayed and jetted on said flashing face.

25. A disassembling method as defined in claim 21, wherein said supplying step occurs at least one of during and before said moving step.

26. A disassembling method as defined in claim 21, wherein, outside a path of said flashing face in conveyance, said cleanser liquid is one of sprayed and jetted on a portion of said tape in said supplying step to be used for wiping said flashing face.

27. A disassembling method as defined in claim 21, wherein, in said supplying step, after said cleanser liquid is supplied, said flash device is conveyed, and then the flashing face is wiped with said tape.

28. A disassembling method as defined in claim 21, wherein, in said supplying step, said flashing face is supplied with said cleanser liquid and wiped with said tape in said moving step while being situated in one position.

29. A disassembling method as defined in claim 21, wherein said tape is supplied in a direction which is transverse to a conveyance direction of said flash device.

30. A disassembling method as defined in claim 27, wherein said flash device is conveyed by a conveyer belt.

31. A disassembling method as defined in claim 29, wherein said flash device is conveyed by a turntable.

32. A disassembling method as defined in claim 29, wherein said flash device is moved back and forth between a station of said supplying of for said cleanser liquid and a station for conducting said wiping.

33. A method of cleaning a flashing face of a flash device incorporated in a used lens-fitted photo film unit, comprising the steps of:

supporting said flash device so as to face upward said flashing face;

supplying cleanser liquid to said flashing face in response to a signal from a control unit;

bringing cleaning tape in contact with said flashing face in response to a signal from a control unit; and conveying said flash device to move said tape relatively to said flashing face while keeping said tape in contact with said flashing face in response to a signal from a control unit, so as to wipe and cleanse said flashing face.

34. A cleaning method as defined in claim 33, wherein said cleanser liquid comprises a volatile alcohol.

35. A cleaning method as defined in claim 33, wherein said tape is of non-woven fabric.

36. A cleaning method as defined in claim 33, wherein said cleanser liquid is one of dripped, sprayed and jetted on said flashing face during said supplying step.

37. A cleaning method as defined in claim 33, wherein said cleanser liquid is one of sprayed and jetted in said supplying step at lest one of during and before said moving step.

38. An apparatus for automatically disassembling a used lens-fitted photo film unit inclusive of first and second parts, said first part having a retaining member formed integrally thereon, and said secon part having a first portion formed integrally thereon and retained on said retaining member so as to couple said second part to said first part, said disassembling apparatus comprising:

control means for outputting control signals and automatically controlling operation of the apparatus by said control signals;

an access member for disengaging said retaining member from said first portion in response to a control signal generated by said control means;

moving means for moving said access member between advanced and retracted positions in response to a control signal generated by said control means, said access member, when standing in said advanced position, being inserted between said retaining member and said first portion with said photo film unit set in a predetermined orientation, so as to release said first portion from said retaining member under control of said control means;

shifting means for shifting said access member in a direction substantially transverse movement of said moving means, so as to capture said second part with said access member as said second part is disengaged from said first part in response to a control signal generated by said control means; and said moving means retracting said access member while said second part is captured by said access member, so as to remove said second part from said first part in response to a control signal generated by said control means.

39. A disassembling apparatus as defined in claim 38, wherein said access member is a plate of which an end is tapered.

40. A disassembling apparatus as defined in claim 38, wherein said photo film unit has a third part disposed between said first and second parts, said first part has a second retaining member formed integrally thereon, and said third part has a second portion formed integrally thereon and retained on said second retaining member so as to couple said third part to said first part; and which apparatus further comprises:

a second access member for releasing said second portion while pressing said second retaining member under control of said control means;

a capturing member for capturing said third part under control of said control means;

second moving means for advancing said capturing member to said third part under control of said control means; and displacing means for displacing said advanced capturing member to a capturing position where said third part is captured, said capturing member being retracted from said first part while said second retaining member is pressed, so as to remove said third part from said first part under control of said control means.

41. A disassembling apparatus as defined in claim 40, wherein said second access member is a bar.

42. A disassembling apparatus as defined in claim 41, wherein said capturing member is retracted from said first part at a small distance while capturing said third part, said second access member is retracted while said second retaining member is pressed and flexed by said second portion without retention between said second retaining member and said second portion, and afterwards said capturing member is completely retracted from said first part.

43. A disassembling apparatus as defined in claim 42, which further comprises a resistor for being connected to a pair of terminals of a main capacitor of said flash device in order to short-circuit and discharge said main capacitor, before pressing said second retaining member.

44. A disassembling apparatus as defined in claim 43, wherein said photo film unit has a battery chamber formed in said first part, a battery contained therein, and first and second terminal members disposed in said battery chamber to contact respectively a pair of electrodes of said battery, and said battery is fitted between said first and second terminal members to be retained in said battery chamber; and which apparatus further comprises:
an insert member for pressing said first terminal member in a direction apart from said battery, so as to release said battery from being fitted on said first and second terminal members in response to a control signal generated by said control means;
an ejector member for being advanced toward an inside of said battery chamber in response to a control signal generated by said control means; and
third shifting means for shifting said ejector member while said first terminal member is pressed, so as to eject said battery from said battery chamber in response to a control signal generated by said control means.

45. An apparatus for cleaning a flashing face of a flash device incorporated in a used lens-fitted photo film unit, comprising:
control means for generating control signals and automatically controlling the apparatus;
support means for supporting said flash device so as to face upward said flashing face;
cleanser supplying means for supplying cleanser liquid to said flashing face in response to a control signal generated by said control means;
tape supplying means for supplying cleaning tape in response to a control signal generated by said control means;
a cleaning head for bringing a portion of said tape in contact with said flashing face in response to a control signal generated by said control means; and
a head driver for moving said cleaning head while keeping said tape in contact with said flashing face, so as to wipe and cleanse said flashing face as said flash device is conveyed in response to a control signal generated by said control means.

46. A cleaning apparatus as defined in claim 45, which further comprises conveyer means for conveying said support means to said cleanser supplying means and said cleaning head with said flash device supported.

47. A method for removing a flash device from a used lens-fitted photo film, which includes a main body and said flash device disposed in front of said main body and provided with a main capacitor, said main body having a retaining member formed integrally thereon, said flash device being retained on said retaining member so as to couple said flash device to said main body, said removing method comprising steps of:
connecting a resistor to a pair of terminals of said main capacitor of said flash device, so as to short-circuit and discharge said main capacitor in response to a signal from a control unit;
pressing said retaining member so as to release said flash device;
advancing to said flash device a capturing member for capturing said flash device in response to a signal from a control unit;
displacing said capturing member to a capturing position where said flash device is captured in response to a signal from a control unit; and
retracting said capturing member from said main body with said flash device captured, while said retaining member is pressed, so as to remove said flash device from said main body in response to a signal from a control unit.

48. A flash removing method as defined in claim 47, wherein said photo film unit further has a front cover which is disposed in front of said flash device, secured to said main body, and removed before said discharge of said main capacitor.

49. A method for automatically dissembling a used photographic film unit having first and second parts, said first part having N hooks formed thereon, N being an integer, and said second part having a first portion formed thereon, said first portion being engaged with said hooks to couple said second part to said first part, said method comprising the steps of:
setting said film unit in a disassembling station in a predetermined orientation;
automatically advancing an access device, having N access plates, toward a designated side of said film unit, all of said hooks being accessible from said designated side in response to a signal from a control unit;
automatically engaging each access plate with a respective one of said hooks to flex said hooks and disengage said hooks from said first portion in response to a signal from a control unit; and
automatically separating said second part from said first part in response to a signal from a control unit.

50. A method for automatically disassembling a used photographic film unit having first and second parts, said first part having hooks formed thereon and said second part having a first portion formed thereon, said first portion being engaged with said hooks to couple said second part to said first part, said method comprising the steps of:
setting said film unit in a disassembling station in a predetermined orientation;

automatically advancing an access device, having access plates, toward said film unit in response to a signal from control unit;

automatically engaging each access plate with a respective one of said hooks;

automatically moving said access plates through a predetermined stroke distance to flex said hooks and disengage said hooks from said first portion in response to a signal from a control unit; and automatically moving said access device away from said film unit to separate said second part from said first part, said predetermined stroke distance being set to allow flexure of said hooks without interfering with other portions of the film unit during said moving step in response to a signal from a control unit.

* * * * *